(12) United States Patent
Hill et al.

(10) Patent No.: US 12,201,064 B2
(45) Date of Patent: Jan. 21, 2025

(54) SYSTEMS AND METHODS FOR CONTROLLING WINDROW SIZE

(71) Applicant: DEERE & COMPANY, Moline, IL (US)

(72) Inventors: Kellen B. Hill, Ottumwa, IA (US); Mitchell R. Usasz, Ottumwa, IA (US); Eric M. Thies, Ottumwa, IA (US)

(73) Assignee: Deere & Company, Moline, IL (US)

( * ) Notice: Subject to any disclaimer, the term of this patent is extended or adjusted under 35 U.S.C. 154(b) by 902 days.

(21) Appl. No.: 17/303,672

(22) Filed: Jun. 4, 2021

(65) Prior Publication Data

US 2022/0386533 A1 Dec. 8, 2022

(51) Int. Cl.
*A01D 57/30* (2006.01)
*A01B 79/00* (2006.01)

(52) U.S. Cl.
CPC ............ *A01D 57/30* (2013.01); *A01B 79/005* (2013.01)

(58) Field of Classification Search
CPC ....... A01D 57/30; A01D 34/664; A01D 43/10
See application file for complete search history.

(56) References Cited

U.S. PATENT DOCUMENTS

| 5,943,848 | A | * | 8/1999 | Rice | ............... | A01D 34/664 |
| | | | | | | 56/16.4 B |
| 10,582,659 | B2 | * | 3/2020 | Fay, II | ............ | A01D 43/006 |
| 2011/0029909 | A1 | * | 2/2011 | Matousek | ............ | A01F 15/10 |
| | | | | | | 715/771 |
| 2011/0302897 | A1 | * | 12/2011 | Hoffman | ............ | A01D 43/10 |
| | | | | | | 56/192 |
| 2014/0083071 | A1 | * | 3/2014 | Fay, II | ............ | A01D 45/00 |
| | | | | | | 56/14.7 |
| 2018/0325024 | A1 | * | 11/2018 | Rotole | ............ | A01D 34/006 |
| 2018/0325028 | A1 | * | 11/2018 | Rotole | ............ | A01D 41/1243 |
| 2018/0325029 | A1 | * | 11/2018 | Rotole | ............ | A01D 57/26 |
| 2018/0325031 | A1 | * | 11/2018 | Rotole | ............ | A01D 43/102 |
| 2018/0325032 | A1 | * | 11/2018 | Rotole | ............ | G05D 1/0278 |
| 2020/0205345 | A1 | * | 7/2020 | Bollinger | ............ | A01D 57/26 |
| 2021/0045283 | A1 | * | 2/2021 | Faust | ............ | A01D 89/006 |

* cited by examiner

*Primary Examiner* — Abigail A Risic

(57) ABSTRACT

Systems and methods for controlling formation of a windrow in response to a single control input. The single control input represents a desired windrow width. The single control input is used to determine positions of components of a cutter implement, such as side shields and a swath flap, that are used to form a windrow having the desired windrow width represented or that is otherwise associated with the single control input.

23 Claims, 14 Drawing Sheets

FIG. 8

| Side Shields \ Swath Flap | 0 | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|---|
| 0 | 100.0 | 97.5 | 95.0 | 90.0 | 85.0 | 75.0 | 65.0 | 55.0 | 45.0 | 35.0 | 30.0 | 25.0 | 20.0 | 15.0 | 10.0 | 7.5 | 5.0 | 2.5 | 0.0 | 0.0 | 0.0 |
| 5 | 100.0 | 97.5 | 95.0 | 90.1 | 85.3 | 75.6 | 66.0 | 56.4 | 46.8 | 37.1 | 32.3 | 27.4 | 22.5 | 17.6 | 12.8 | 10.3 | 7.7 | 5.2 | 2.7 | 2.6 | 2.5 |
| 10 | 100.0 | 97.5 | 95.0 | 90.3 | 85.5 | 76.3 | 67.0 | 57.8 | 48.5 | 39.3 | 34.5 | 29.8 | 25.0 | 20.3 | 15.5 | 13.0 | 10.5 | 8.0 | 5.5 | 5.3 | 5.0 |
| 15 | 100.0 | 97.5 | 95.0 | 90.4 | 85.8 | 76.9 | 68.0 | 59.1 | 50.3 | 41.4 | 36.8 | 32.1 | 27.5 | 22.9 | 18.3 | 15.8 | 13.3 | 10.8 | 8.2 | 7.9 | 7.5 |
| 20 | 100.0 | 97.5 | 95.0 | 90.5 | 86.0 | 77.5 | 69.0 | 60.5 | 52.0 | 43.5 | 39.0 | 34.5 | 30.0 | 25.5 | 21.0 | 18.5 | 16.0 | 13.5 | 11.0 | 10.5 | 10.0 |
| 25 | 100.0 | 97.5 | 95.0 | 90.6 | 86.3 | 78.1 | 70.0 | 61.9 | 53.8 | 45.6 | 41.3 | 36.9 | 32.5 | 28.1 | 23.8 | 21.3 | 18.8 | 16.3 | 13.8 | 13.1 | 12.5 |
| 30 | 100.0 | 97.5 | 95.0 | 90.8 | 86.5 | 78.8 | 71.0 | 63.3 | 55.5 | 47.8 | 43.5 | 39.3 | 35.0 | 30.8 | 26.5 | 24.0 | 21.5 | 19.0 | 16.5 | 15.8 | 15.0 |
| 35 | 100.0 | 97.5 | 95.0 | 90.9 | 86.8 | 79.4 | 72.0 | 64.6 | 57.3 | 49.9 | 45.8 | 41.6 | 37.5 | 33.4 | 29.3 | 26.8 | 24.3 | 21.8 | 19.3 | 18.4 | 17.5 |
| 40 | 100.0 | 97.5 | 95.0 | 91.0 | 87.0 | 80.0 | 73.0 | 66.0 | 59.0 | 52.0 | 48.0 | 44.0 | 40.0 | 36.0 | 32.0 | 29.5 | 27.0 | 23.5 | 22.0 | 21.0 | 20.0 |
| 45 | 100.0 | 97.5 | 95.0 | 91.1 | 87.3 | 80.6 | 74.0 | 67.4 | 60.8 | 54.1 | 50.3 | 46.4 | 42.5 | 38.6 | 34.8 | 32.3 | 29.8 | 27.3 | 24.8 | 23.6 | 22.5 |
| 50 | 100.0 | 97.5 | 95.0 | 91.3 | 87.5 | 81.3 | 75.0 | 68.8 | 62.5 | 56.3 | 52.5 | 48.8 | 45.0 | 41.3 | 37.5 | 35.0 | 32.5 | 30.0 | 27.5 | 26.3 | 25.0 |
| 55 | 100.0 | 97.5 | 95.0 | 91.4 | 87.8 | 81.9 | 76.0 | 70.1 | 64.3 | 58.4 | 54.8 | 51.1 | 47.5 | 43.9 | 40.3 | 37.8 | 35.3 | 32.8 | 30.3 | 28.9 | 27.5 |
| 60 | 100.0 | 97.5 | 95.0 | 91.5 | 88.0 | 82.5 | 77.0 | 71.5 | 66.0 | 60.5 | 57.0 | 53.5 | 50.0 | 46.5 | 43.0 | 40.5 | 38.0 | 35.5 | 33.0 | 31.5 | 30.0 |
| 65 | 100.0 | 97.5 | 95.0 | 91.6 | 88.3 | 83.1 | 78.0 | 72.9 | 67.8 | 62.6 | 59.3 | 55.9 | 52.5 | 49.1 | 45.8 | 43.3 | 40.8 | 38.3 | 35.8 | 34.1 | 32.5 |
| 70 | 100.0 | 97.5 | 95.0 | 91.8 | 88.5 | 83.8 | 79.0 | 74.3 | 69.5 | 64.8 | 61.5 | 58.3 | 55.0 | 51.8 | 48.5 | 46.0 | 43.5 | 41.0 | 38.5 | 36.8 | 35.0 |
| 75 | 100.0 | 97.5 | 95.0 | 91.9 | 88.8 | 84.4 | 80.0 | 75.6 | 71.3 | 66.9 | 63.8 | 60.6 | 57.5 | 54.4 | 51.3 | 48.8 | 46.3 | 43.8 | 41.3 | 39.4 | 37.5 |
| 80 | 100.0 | 97.5 | 95.0 | 92.0 | 89.0 | 85.0 | 81.0 | 77.0 | 73.0 | 69.0 | 66.0 | 63.0 | 60.0 | 57.0 | 54.0 | 51.5 | 49.0 | 46.5 | 44.0 | 42.0 | 40.0 |
| 85 | 100.0 | 97.5 | 95.0 | 92.1 | 89.3 | 85.6 | 82.0 | 78.4 | 74.8 | 71.1 | 68.3 | 65.4 | 62.5 | 59.6 | 56.8 | 54.3 | 51.8 | 49.3 | 46.8 | 44.6 | 42.5 |
| 90 | 100.0 | 97.5 | 95.0 | 92.3 | 89.5 | 86.3 | 83.0 | 79.8 | 76.5 | 73.3 | 70.5 | 67.8 | 65.0 | 62.3 | 59.5 | 57.0 | 54.5 | 52.0 | 49.5 | 47.3 | 45.0 |
| 95 | 100.0 | 97.5 | 95.0 | 92.4 | 89.8 | 86.9 | 84.0 | 81.1 | 78.3 | 75.4 | 72.8 | 70.1 | 67.5 | 64.9 | 62.3 | 59.8 | 47.3 | 54.8 | 52.3 | 49.9 | 47.5 |
| 100 | 100.0 | 97.5 | 95.0 | 92.5 | 90.0 | 87.5 | 85.0 | 82.5 | 80.0 | 77.5 | 75.0 | 72.5 | 70.0 | 67.5 | 65.0 | 62.5 | 60.0 | 57.5 | 55.0 | 52.5 | 50.0 |

SYSTEMS AND METHODS FOR CONTROLLING WINDROW SIZE

FIELD OF THE DISCLOSURE

The present disclosure relates generally to cutter implements used to form windrows of severed crop material, such as cutter implements carried by self-propelled windrowers or another agricultural vehicle, such as a tractor.

BACKGROUND OF THE DISCLOSURE

Cutter implements, such as those coupled to a self-propelled windrower or attached to an agricultural tractor, operate to sever crops, such as small grain crops. In some cases, the cutter implements also deposit the severed crop material in a windrow along the ground. Placing the severed crop material in a windrow promotes drying of the crop material. Once the crop material has dried to a desired level, e.g., a moisture content of the severed crop has reached a desired level, the severed crop material forming the windrow is collected, such as in the form of bales.

SUMMARY OF THE DISCLOSURE

A first aspect of the present disclosure is directed to a system for controlling a width of a windrow using a single user input. The system may include a cutter implement that may include side shields lateral offset from each other and a swath flap extending laterally between the side shields. The side shields may be moveable within a first range, and the swath flap may be movable within a second range. In response to a single control input, the side shields may be movable to a first position within the first range and the swath flap may be movable to a second position within the second range.

A second aspect of the present disclosure is directed to a computer-implemented method for controlling a width of a windrow using a single user input. The method may include receiving a single control input by an input device, the single control input representing a desired width of a windrow produced by a cutter implement; determining, with an electronic processor, a first target position of side shields of the cutter implement in response to the received single control input; determining, with the electronic processor, a second target position of a swath flap of the cutter implement in response to the received single input; displacing the side shields to the first target position; and displacing the swath flap to the second target position.

The various aspects may include one or more of the following features. The single control input may define a desired width of a windrow to be produced by the cutter implement, and movement of the side shields to the first position within first range and movement of the swath flap to the second position within the second range in response to the single control input may produce a windrow having the desired width during an agricultural operation. A feedback system may be included. An optical sensor may detect a width of the produced windrow. A computer-implemented controller may compare the detected width of the produced windrow with the desired width, detect a variance between the detected width and the desired width, and alter a position of one of the side shields and the swath flap to reduce or eliminate the variance. The optical sensor may include a camera. The camera may include a stereo camera. An input device may receive the single control input. A computer-implemented controller may be coupled to the input device. The computer-implemented controller may determine the first position of the side shields in response to receipt of the single control input and determine the second position of the swath flap in response to receipt of the single control input, generate a first control signal that defines a movement of the side shields to the first position, and generate a second control signal that defines a movement of the swath flap to the second position. At least one first actuator may be coupled to the side shields, and a second actuator may be coupled to the swath flap. The least one first actuator may receive the first control signal and displace the side shields to the first position in response to the first control signal. The second actuator may receive the second control signal and displace the swath flap to the second position in response to the second control signal. The first position of the side shields and the second position of the swath flap may be correlated to produce a windrow having a desired width during an agricultural operation. The correlation may include one of a lookup table or a mathematical relationship.

The various aspects may include one or more of the following features. A first position of the side shields may be detected with at least one first position sensor. A second position of the swath flap may be detected with a second position sensor. Displacing the side shields to the first target position may include displacing the side shields from the first position to the first target position, and displacing the swath flap to the second target position may include displacing the swath flap from the second position to the second target position. A width of a windrow produced by the cutter implement may be detected. The detected width may be compared to the desired width. A variance based on the comparison of the detected with and the selected width may be determined, and at least one of the side shields and the swath flap may be moved to reduce or eliminate the variance. Detecting a width of the windrow produced by the cutter implement may include sensing the windrow with an optical sensor. Determining a first target position of side shields of the cutter implement in response to the received single control input may include using a reference table to identify the first target position. Determining the second target position of the swath flap of the cutter implement in response to the received single input may include using the lookup table to identify the second target position. Receiving the single control input that represents the desired width of the windrow produced by the cutter implement may include receiving the single control input via a user interface. Displacing the side shields to the first target position may include actuating at least one first actuator in response to a received first control signal. Displacing the swath flap to the second target position may include actuating a second actuator in response to a received second control signal. The first target position of the side shields and the second target position of the swath flap may be correlated to produce a windrow having the desired width during an agricultural operation.

Other features and aspects will become apparent by consideration of the detailed description and accompanying drawings.

BRIEF DESCRIPTION OF THE DRAWINGS

The detailed description of the drawings refers to the accompanying figures in which:

FIG. 8 is graphical image of an example lookup table, according to some implementations of the present disclosure.

DETAILED DESCRIPTION

Figure 1:
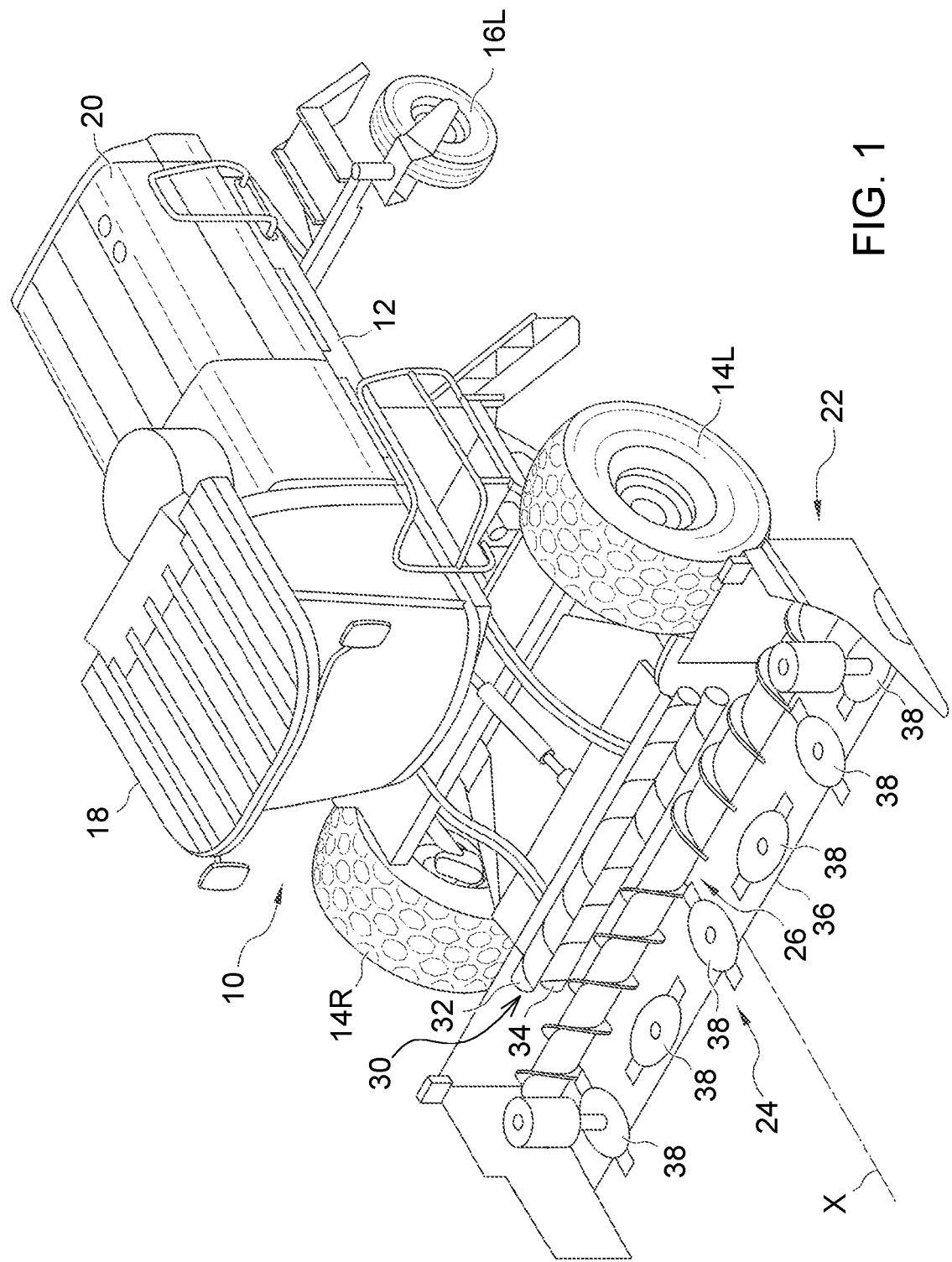
FIG. 1 is a perspective view of an example self-propelled windrower, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward," are used in the context of the illustrated examples as would be understood by one skilled in the art and are not intended to limit the disclosure. For example, for a particular type of vehicle in a conventional configuration and orientation, one skilled in the art would understand these terms as the terms apply in the particular context.

The present disclosure is directed to systems and methods for producing a windrow of a desired size and, more particularly, producing a windrow using a single control input to form a windrow having a desired width. Cutter implements include side shields and a swath flap that are used to form a windrow of severed crop material. Conventionally, the side shields and swath flap are adjusted separately, i.e., with separate controls, to form the windrow with the desired width. The present disclosure provides for a single control that receives a single control input, and the single control input is used to alter a position of both the side shields and the swath flap to produce a windrow having a desired width. By altering positions of both the side shields and the swath flap in response to a single control input provided to a single control, the time associated with adjusting a windrow size, e.g., width, is reduced and complexity of the cutter implement is similarly reduced. Further, a single control that is used to alter one or both of the side shields and swath flap increases ease of operation of the cutter implement, reduces the number of controls used to operate the cutter implement, and reduces trial and error associated with manipulating the side shields and swath flap separately in order to generate a windrow having a desired size, for example, a desired width. Further, in some instances, the control for controlling the position of the side shields and the swath flap are is computer implemented and is present within an operator's compartment (e.g., a cabin of a self-propelled windrower or an agricultural tractor used to carry a cutter implement) for convenient operation. Further, by providing the control accessible to an operator during a windrowing operation, such as in a cab of a work vehicle being operated to form a windrow, the operator is able to alter a size of the produced windrow without having to stop the windrowing operation.

The scope of the present disclosure encompasses work vehicles having a cutter implement, such as a self-propelled windrower, or an agricultural tractor coupled with one or more cutter implements. Thus, while the present disclosure provides particular example, the scope of the present disclosure is not so limited but, rather, encompasses cutter implements coupled to any type of work machine.

FIG. 1 is a perspective view of an example self-propelled windrower 10 that mows and collects standing crop in a field, conditions the cut crop material as the crop material moves through the machine to improve its drying characteristics, and returns the conditioned crop material to the field in a windrow or swath. As explained earlier, although a self-propelled windrower is described, the scope of the present disclosure encompasses any cutter implement. For example, the scope of the present disclosure includes cutter implements that are carried on or otherwise coupled to a work machine, such as an agricultural tractor. In some implementations, a cutter implement is pulled by the vehicle to mow or condition crops or grasses or both. In other implementations, a cutter implement is pushed by an agricultural vehicle to mow or condition crops or grasses, or both.

The windrower 10 includes a main frame 12 supported on driven right and left front wheels 14R and 14L, respectively, and on right and left caster mounted rear wheels, of which only a left rear wheel 16L is shown. Carried on a forward end region of the frame 12 is a cab 18. Mounted on the frame 12 behind the cab 18 is a housing 20 within which is located a power source (not shown) such as an internal combustion engine. A cutter implement 22 is coupled to and is supported by the forward end of the frame 12. Operator controls are provided in the cab 18 for operation of the windrower 10, including the attached cutter implement 22.

The cutter implement 22 includes a rotary disc cutter bar 24 that includes an elongate housing 36 and a plurality of cutter discs 38 supported on the housing 36. The cutter discs 38 are rotated to sever crop from the ground. The cutter discs 38 are located forward or upstream of a crop conditioner assembly 30. Each of the cutter discs 38 is coupled to an upright drive shaft. The shafts are powered to cause the cutter discs 38 to rotate. Although the illustrated example includes cutter discs 36, in other implementations, other types of cutters may be used. The rotary disc cutter bar 24 delivers cut severed material to a following crop converging auger 26 that delivers the crop material rearward for further processing by the conditioner assembly 30. The conditioner assembly 30 includes upper and lower crop conditioner rolls 32 and 34, respectively. Conditioned crop material is expelled rearwardly by the conditioner rolls 32 and 34. The expelled crop material is subsequently formed into a windrow, as described in more detail below.

Figure 2:
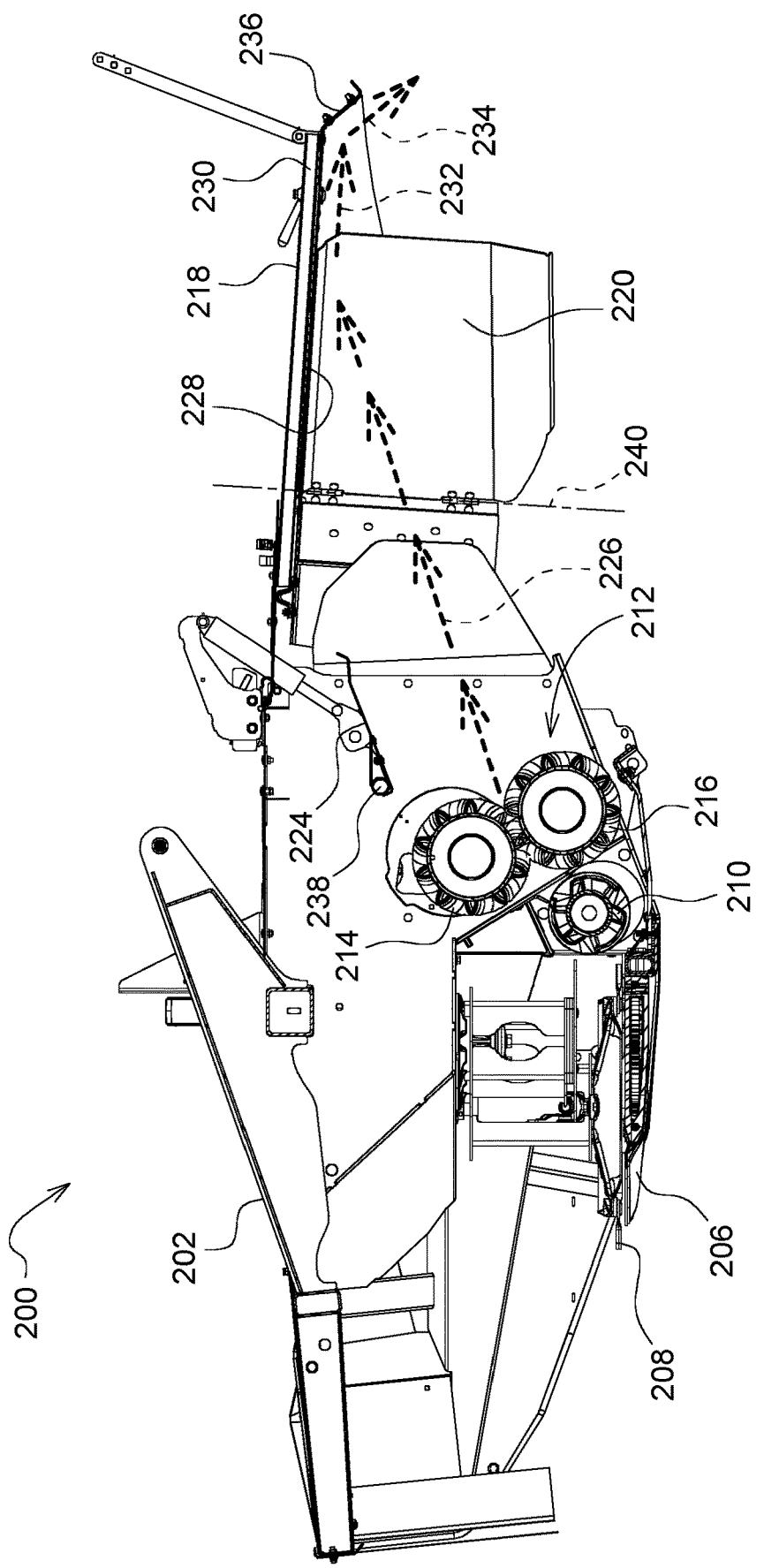
FIG. 2 is a side detail view of an example cutter implement with side shields and a swath flap in a first configuration, according to some implementations of the present disclosure.

FIG. 2 is a detailed side view of an example cutter implement 200 that may be similar to the cutter implement 22. The cutter implement 200 includes a frame 202 to which a cutter bar 206 is coupled. The cutter bar 206 includes a plurality of rotary discs 208 that are rotated to sever crop from the ground. The cutter implement 200 also includes a converging auger 210 disposed rearward of the cutter bar 206. The converging auger 210 removes crop from the cutter bar 206 and moves the crop material to a conditioner assembly 212.

The conditioner assembly 212 includes a pair of conditioner rolls 214, 216 for conditioning the severed crop material. In some implementations, the auger 210 and conditioner roll 216 rotate in the same rotational direction, while the conditioner roll 214 rotates in an opposite rotational direction of the conditioner roll 216 and auger 210. The conditioner rolls 214, 216 are rotatably driven such that crop material passes therebetween and is crimped by the conditioner rolls 214 and 216. Once the crop material is crimped by the conditioner assembly 212, the crop material is flung or thrown rearwardly where the crop material encounters features that operate to define a shape of the resulting windrow.

In some implementations, the conditioner assembly 212 includes an impeller with a plurality of tines and a conditioner hood. Various other types of crop conditioner assemblies or systems may be used instead of or in addition to the crop conditioner assembly 212 shown in the Figures and described herein. Such other crop conditioner assemblies or systems may include, but are not limited to, flail/impeller conditioners and the like. Thus, the present disclosure is not limited to any particular type of conditioner assembly or conditioner system.

Figure 3:
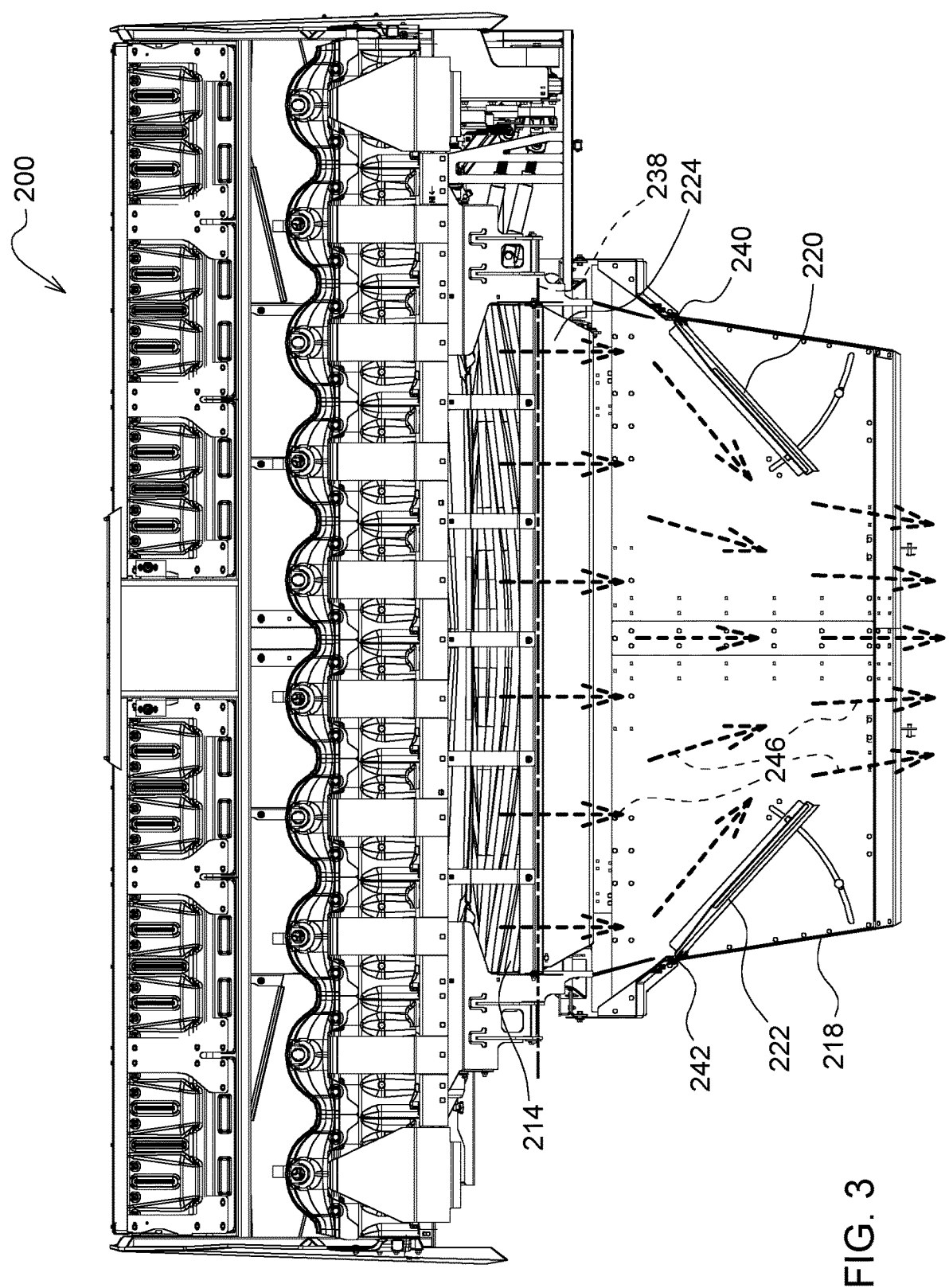
FIG. 3 is a bottom detail view of the cutter implement of FIG. 2 with side shields and a swath flap in the first configuration.

Referring to FIGS. 2 and 3, the features that are used to form a windrow include a forming shield 218, side shields 220 and 222, and a swath flap 224. In the illustrated example, the forming shield 218 is disposed rearward and above the conditioner assembly 212. Crop material expelled from the conditioner assembly 212 in the direction of arrow 226 impinges on a surface 228 of the forming shield 218. In some instances, crop material expelled from the conditioner assembly 212 follows along a portion 230 the surface 228 (as indicated by arrow 232). The crop material is deflected towards the ground in the direction of arrow 234 by an angled portion 236 of the forming shield 218.

The side shields 220, 222 and the swath flap 224 are movable to affect a size of a windrow produced by the cutter implement 200. As shown in FIG. 2, the swath flap 224 is pivotable about an axis 238, permitting the swath flap 224 to pivot about an angular range. As shown in FIG. 3, side shields 220 and 222 are pivotable about respective axes 240 and 242.

FIGS. 2 and 3 illustrate a configuration of the cutter implement 200 in which the side shields 220, 222 are in a fully inwardly displaced position and the swath flap 224 is in a fully raised position. As shown in FIG. 2, with the swath flap 224 in a fully raised position, flow of the conditioned crop material (represented by arrows, e.g., arrows 226, 232, and 234) is not affected by the swath flap 224. That is, the condition crop material exiting the conditioner rolls 214 and 216 do not impact the swath flap 224. Rather, the crop material instead impacts the surface 228 of the forming shield 218, as described above. As shown in FIG. 3, with the side shields in a fully inwardly displaced position, the condition crop material is funneled, as indicated by arrows 244, as the conditioned crop material impacts the side shields 220 and 222, resulting in the condition crop material being formed into a windrow having a narrow width. In this configuration, the cutter implement 200 produces the greatest restriction to the conditioned crop material. As a result, a windrow formed by the cutter implement 200 having this configuration has the narrowest width that the cutter implement 200 is capable of forming.

Figure 4:
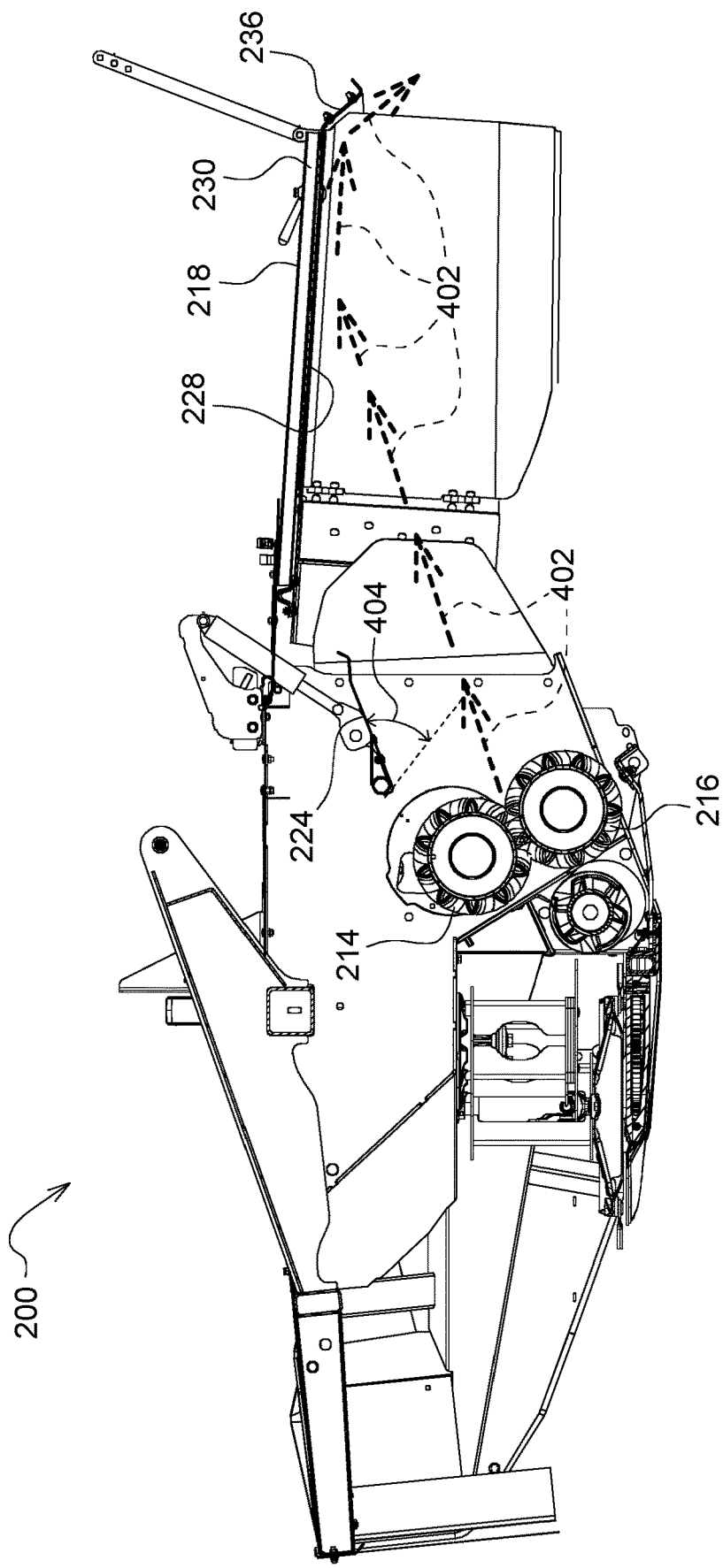
FIG. 4 is another side detail view of the example cutter implement of FIG. 2 with the side shields and the swath flap in a second configuration, according to some implementations of the present disclosure.
Figure 5:
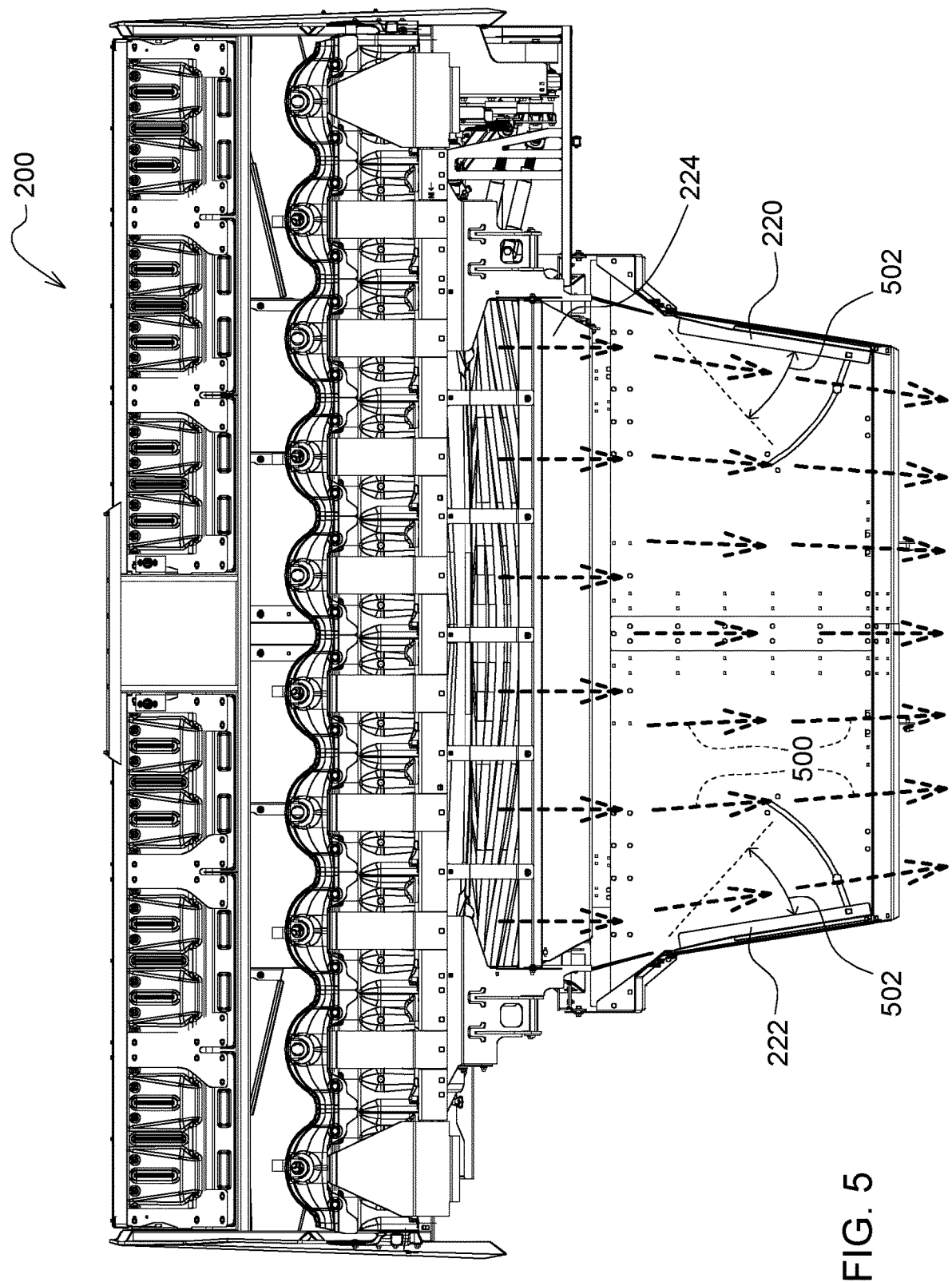
FIG. 5 is another bottom detail view of the example cutter implement of FIG. 2 with the side shields and the swath flap in the second configuration, according to some implementations of the present disclosure.

As explained earlier, both the swath flap 224 and the side shields 220 and 222 are moveable over a range about respective axes 238, 240, and 242. FIGS. 2 and 3 illustrate the swath flap 224 and the side shields 220 and 222 of the cutter implement 200 at one position of a plurality of positions to which these components are capable of being positioned along the components' respective ranges of motion. FIGS. 4 and 5 illustrate another configuration of the cutter implement 200 with the swath flap 224 maintained at the fully raised position and the side shields 220 and 222 positioned at a fully outwardly displaced position. With the side shields 220 and 222 so positioned, the amount by which the side shields 220 and 222 funnel the conditioned crop material is reduced, as indicated by arrows 500. The conditioned crop material expelled by the conditioner rolls 214 and 216 are, again, impinged onto the surface 228 of the forming shield 218, follows the surface portion 230, and is deflected downwards towards the ground by the angled portion 236. The path followed by the conditioned crop material is indicated by arrows 402. In this configuration, the cutter implement 200 produces a windrow having a medium or midsized width. This midsized width is greater than the width formed by the cutter implement 200 in the configuration illustrated in FIGS. 2 and 3.

Figure 6:
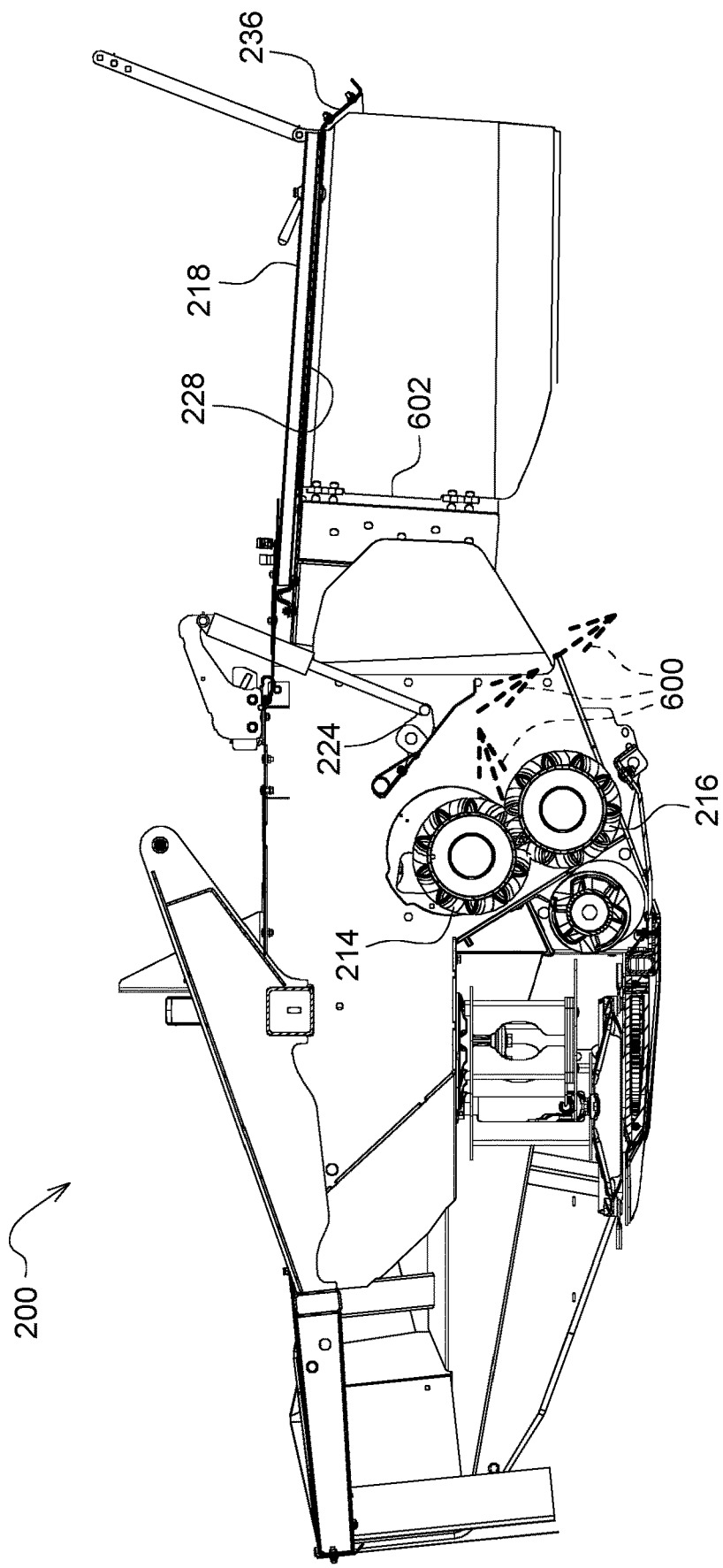
FIG. 6 is another side detail view of the example cutter implement of FIG. 2 with the side shields and swath flap in a third configuration, according to some implementations of the present disclosure.
Figure 7:
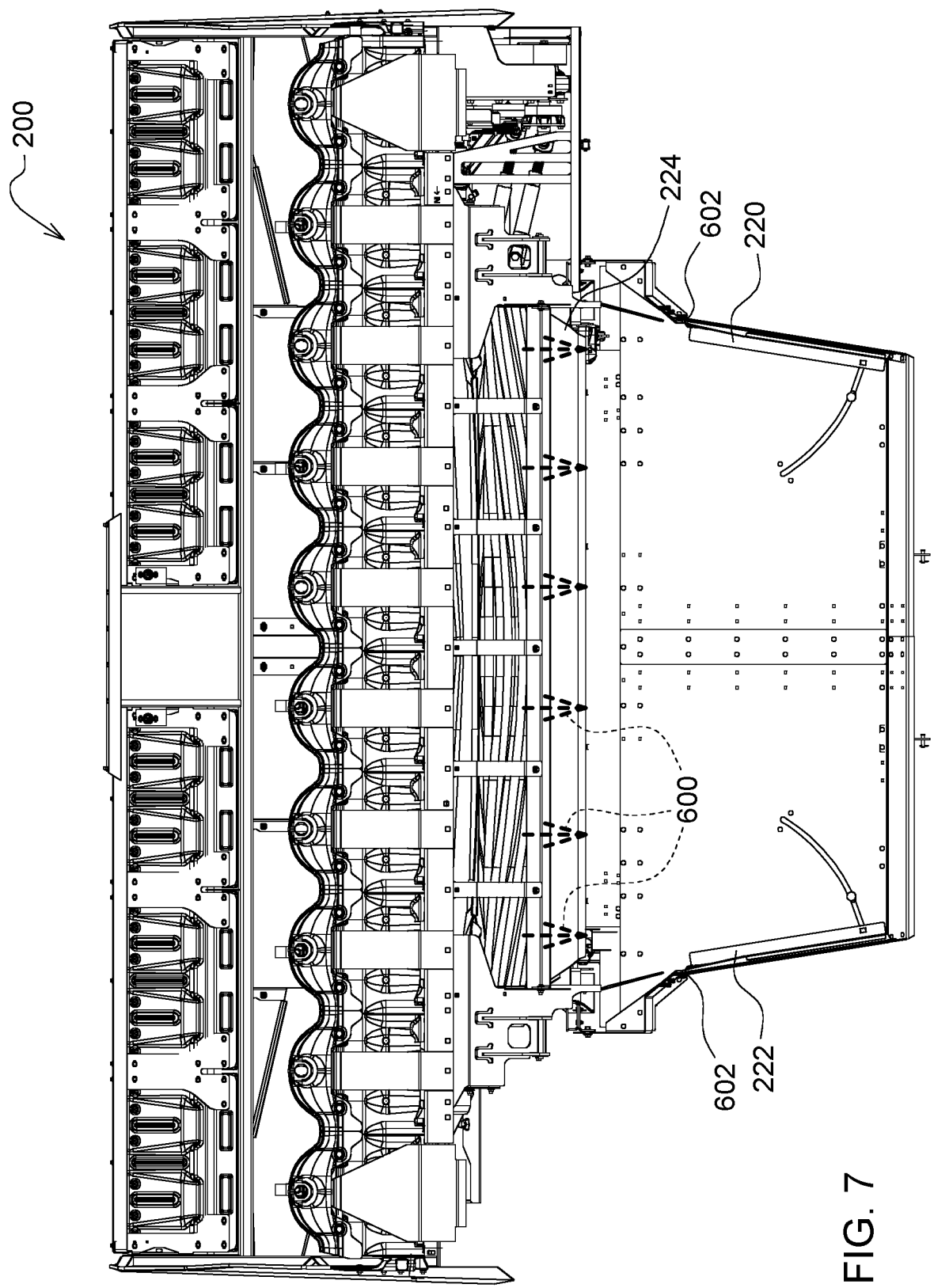
FIG. 7 is another bottom view of the example cutter implement of FIG. 2 with the side shields and swath flap in the third configuration, according to some implementations of the present disclosure.

FIGS. 6 and 7 illustrate the cutter implement 200 with the side shields 220 and 222 and swath flap 224 in another configuration that produces a windrow having the widest width that the cutter implement 200 is capable of forming. In this configuration, the side shields 220 and 222 are positioned in the fully outwardly displaced position, and the swath flap 224 is in a fully lowered position. Conditioned crop material expelled from the conditioner rolls 214 and 216 impinge upon the lowered swath flap 224 and is directed to the ground, as indicated by arrows 600. Because the swath flap 224 engages the conditioned crop material at a location forward of a proximal end 602 of the side shields 220 and 222, a position of the side shields 220 and 222 along the range of movement of the side shields 220 and 22 does not affect a width of the produced windrow. The conditioned crop material is directed to the ground by the swath flap 224 prior to coming into engagement with the side shields 220 and 222, regardless of the position of the side shields 220 and 222. Consequently, for the illustrated example, at the fully lowered position, the swath flap 224, alone, is responsible for defining the resulting width of the produced windrow. In other implementations, however, the positions of the swath flap and side shields may be different than the example shown in FIGS. 2-7. In such instances, how the conditioned crop material interacts with one of the swath flaps and the side shields after interacting with the other of the swath flap and side shields may be different. For example, in some instances, the swath flap and sides shields are configured such that conditioned crop that impinges upon both the swath flap and the side shields notwithstanding the swath flap being located in a fully lowered position. The scope of the present disclosure is intended to encompass any type of cutter implement having a swath flap and side shields and provide for a single control input to control both the side shields and swath flap to produce a windrow having a desired width.

As explained earlier, the side shields 220 and 222 and the swath flap 224 are independently positionable to any location along respective ranges of movement. For example, as shown in FIG. 4, the swath flap 224 is pivotable about an angular range 404. The swath flap 224 can be moved to any position within the range 404. Similarly, as shown in FIG. 5, the side shields 220 and 222 are pivotable about an angular range 502. The side shields 220 and 222 can be moved to any position within the range 502. Altering the position of the swath flap 224 and side shields 220 and 222 alters a size, e.g., width, of a produced windrow. In some instances, different combinations of the positions of the swath flap and the side shields result in the production of a similar sized windrow.

The positions of the swath flap 224 and the side shields 220 and 222 are correlated, such as with the use of an algorithm or a lookup table, such as lookup table 800, to produce a windrow having a desired width. With the positions of the swath flap 224 and the side shields 220 and 222 correlated, a single control input is used to select a desired size of a windrow, e.g., a width of the windrow. Consequently, a single control input that defines a desired windrow width is used to define positions of both the side shields and the swath flap that result in the formation of a windrow having the desired width. The single control input can be applied in numerous ways. For example, the single control input is received via a single control. Example controls used to receive the single control input include a lever, knob, switch, slider, or other input device can be used to receive the single control input. In still other implementations, example controls that receive the single control input includes a user interface, such as a graphical user interface of a computer system. Example computer systems and GUIs within the scope of the present disclosure are provided in more detail below.

FIG. 8 is an example chart in the form of a lookup table 800 that is used to select a position of each of a swath flap and side shields in order to produce a windrow having a width corresponding to a single input provided by an operator. Columns 802 represent positions of the swath flap, such as swath flap 224. The position of the swath flap is represented as a percentage of a total amount of available movement of the swath flap. In this example, a zero or starting position of the swath flap corresponds to a fully lowered position, similar to that shown in FIG. 6. As the swath flap is displaced upwardly, an indicated amount of articulation increases, i.e., the indicated percentage increases, until, when the swath flap is fully upwardly displaced, the indicated percentage is 100 percent. Rows 804 represent positions of the side shields, such as side shields 220 and 222. The position of the side shields is represented as a percentage of a total amount of a total amount of available movement of the side shields. In this example, a zero or starting position of the side shields corresponds to a fully inwardly displaced position. As the side shields are displaced outwardly, an indicated amount of articulation increases, i.e., the indicated percentage increases, until, when the side shields are fully outwardly displaced, the indicated percentage is 100 percent.

With continued reference to FIG. 8, grid locations 806 associated with a particular row of the rows 804 and a particular column of the columns 802 contain a windrow width as a percentage of a maximum windrow width capable of being produced by a cutter implement. For example, with the swath flap at a zero percent position, i.e., a fully lower position, the associated windrow width is 100 percent, regardless of the position of the side shields for the reasons previously described. As another example, with the swath flap at a 40 percent position, indicated at 808, and the side shields at a 75 percent position, indicated at 810, the corresponding windrow width is 71.3 percent of a maximum possible width of a windrow. In this way, a positional setting of the swath flap and the side shields are identified based on a desired windrow width, here represented as a percentage of a maximum width of a windrow capable of being formed. Thus, if a user desires a windrow having a width that is 78.4 percent of a maximum windrow width capable of being formed, identified at 812, a corresponding swath flap position of 35 percent, shown at 814, and a side shield position of 85 percent, shown at 816, is used. In other implementations, in response to a single control input representing a windrow width, positions of a swath flap and side shields are determined based on a numerical relationship, such as a mathematical relationship. For example, in some implementations, a system of equations is used to determine the respective positions of the side shields and the swath flap in order to define a selected width of a windrow. The equations of the system of equations may define a position of each of the side shields and the swath flap based on the control input that represents a desired windrow width. The system of equations is solved using the control input to determine the respective positions of the side shields and the swath flap. In some implementations, interpolation is used to identify positions of the swath flap and side shields for associated with a single control input that does not precisely correspond to a value in any of the grid locations.

Thus, in some implementations, a user inputs a single control input, such as in the form of a desired percentage of a maximum possible windrow width capable of being formed, using a control (such as an input device, for example, a GUI or other input device described herein). The control input is received into a controller, which, in some instances, is in the form of an electronic computer or electronic computer system.

With continued reference to FIG. 8, another feature of the present disclosure involves the ability to affect a shape of a produced windrow having a selected width. A shape of the windrow, such as a cross-sectional shape of the windrow, having a selected width is adjusted with the use of an overlap function. As shown in grid locations 818 through 824, there are four different combinations of swath flap and side shield settings that will produce a windrow having a 66.0 percent windrow width. However, altering the positions of the swath flap and side shields amongst these settings alters a shape of the windrow. An operator may desire a shape associated with one of these combinations of settings over the others. In some instances, the operator is able to select among each of the different combinations of settings of the swath flap and the side shields associated with a particular windrow width. For example, in some implementations, the operator is able to slide a slider, such as a slider provided on a graphical user interface (GUI). Movement of the slider causes an electronic controller (such as electronic controller 902 or electronic controller 1102, described in more detail below) to move from one combination of settings of the swath flap and side shields associated with a selected windrow width to another in response to manipulation of the slider. In other implementations, a button can be selected move from one combination of settings associated with a selected windrow width to another combination of settings. The overlap function may also be adjusted in other ways, such as using other types of input devices, e.g., keyboard, keypad, mouse, or trackball.

Although the overlap function example involving a 66.0 percent windrow width in the context of the table 800 has four settings combinations of the swath flap and side shield, in other implementations, the number of combinations may be greater or fewer than four combinations. The overlap function allows a user, such as an operator of a cutter implement, to alter a shape of a produced windrow having a selected width by altering positions of the swath flap and side shields to different positions that, in combination, produce a windrow having the selected width.

In some implementations, when an operator inputs a desired windrow width and there are a plurality of combinations of settings of the swath flap and the side shields that will produce the desired windrow width, the electronic controller initially selects the combination of settings that, in the context of table 800, is closest to the upper left hand corner of the table 800, as viewed in the context of FIG. 8. In some implementations, a setting of the swath flap or side shields represents a position at which the swath flap or side shields are positioned, such as a position along a range of possible positions. Thus, in the context of a windrow width of 66.0 percent, the electronic controller selects the grid location 818, corresponding to a side shield setting of five percent and a swath flap setting of 30 percent. For example, as the operator cycles through the different combination of settings associated with 66.0 percent windrow width (such as by sliding a slider), the electronic controller moves to the next combination of settings. In this example, the electronic controller moves from a position near the upper left-hand corner of table 800 to the next location towards the lower right-hand corner of the table 800. Thus, in this example, the electronic controller next moves to the grid location 820. If the operator again alters the overlap function, the electronic controller moves to the next grid location, such as grid location 822, and so on. Where a slide is used, which may be similar to the slider illustrated in FIG. 11 at 1116, a first end of the slide may be associated with a first combination of settings to that produces a selected windrow width that is closest to the upper left-hand corner in the context of a table similar to table 800, shown in FIG. 8. The opposing end of the slider is associated with the combination of settings associated with the selected windrow width located towards the lower right-hand corner of the table. The electronic controller may distribute the number of different available setting combinations of the swath flap and the side shields to produce the selected windrow width along the span of the slider. Thus, if the operator moves from the first end of the slider (which may be associated with the combination of settings closest to the upper left-hand corner) to a location towards the middle of the slider span, the electronic controller selects the corresponding combination of settings that falls in the middle of the plurality of combinations of settings that form the windrow with the selected width. In the context of a 66.0 percent windrow width as shown in table 800, when the operator adjusts the slider towards a mid-portion of the span of the slider, the electronic controller may select grid location 820 or grid location 822, for example, because the grid locations 820 and 822 correspond to a center of the four possible combinations of settings of the swath flap and the side shields that would form a windrow having a 66.0 percent of maximum windrow width. In other implementations, a manner in which the different combinations of settings to produce a desired windrow width may be adjusted in a different way. For example, in some instances, in the context of table 800, moving amongst the different combinations of settings may be performed from the lower right-hand corner to the upper left-hand corner. Still other approaches of moving amongst the different combinations of settings are also contemplated.

In other implementations, a shape of the produced windrow corresponding to each of the combinations of settings of the swath flap and the side shields for a desired windrow width is known and, in some instances, are recorded, such as in a memory (such as memory 906, described below). In some implementations, a first input is provided to a cutter implement, such as via an electronic controller (e.g., electronic controller 902 or electronic controller 1102, described below) defining a desired width of a produced windrow, and a second input is provided to the cutter implement to define a desired shape of the windrow having the desired width. The electronic controller selects the settings (e.g., positions) of the swath flap and the side shields to produce a windrow having the desired width and the desired shape. In some instances, a shape for the produced windrow associated with a particular combination of settings of the swath flap and side shields is presented to a user in graphical form, such as using one or more graphical icons provided on a GUI. The shapes may be presented to an operator in other ways, such as audibly or haptically.

Figure 9:
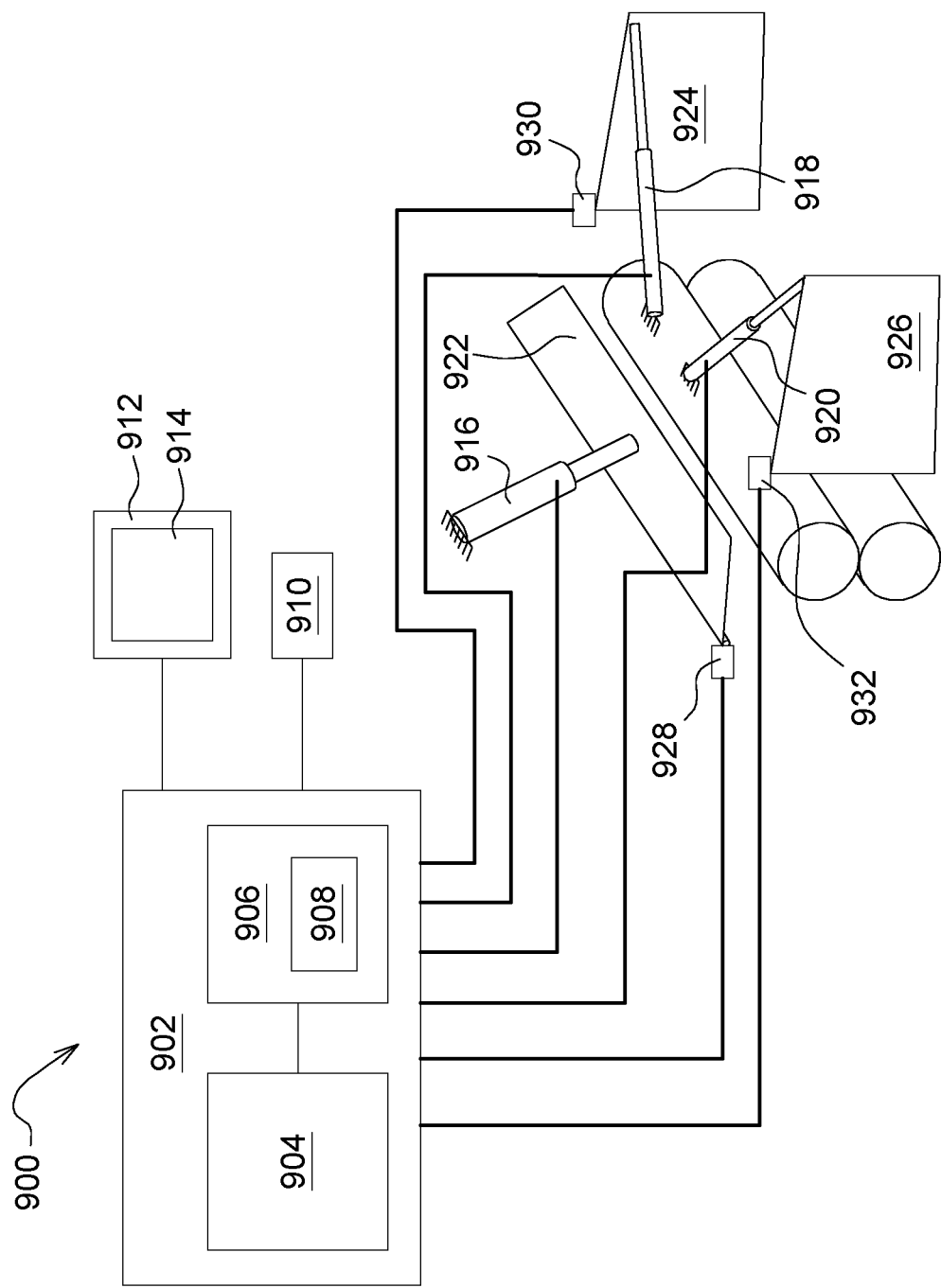
FIG. 9 is a schematic view of an example control system, according to some implementations of the present disclosure.

FIG. 9 is a schematic diagram of an example control system 900 that receives a single control input to define a desired windrow width. In response to the received single control input, a swath flap and side shields of the cutter implement are positioned in order to produce a windrow having the desired windrow width. The control system 900 includes an electronic controller 902. In some implementations, the controller 902 forms or includes an electronic computer system, such as the computer system 1400, described in more detail below. Additional details of the controller 902, such as processor 904 and memory 906, are described below in the context of computer system 1400.

The controller 902 includes the processor 904 that is communicatively coupled to the memory 906. The memory 906 communicates with the processor 904 and is used to store programs and other software, information, and data. The processor 904 is operable to execute programs and software and receive information from and send information to the memory 906. Although a single memory 906 and a single processor 904 are illustrated, in other implementations, a plurality of memories, processors, or both may be used. Although the processor 904 and the memory 906 are shown as being local components of the controller 902, in other implementations, one or both of the processor 904 and memory 906 may be located remotely. Software 908, such as in the form of an application or program, is executed by the processor 904 to control operation of the system 900, as described in more detail below.

In the illustrated example, the system 900 includes a control 910 that is in the form of an input device. The control 910 receives input from a user, such as a control input, and provides the user input to the controller 802. The control 910 is communicably coupled via a wired or wireless connection. Example controls 910 include a keyboard, keypad, one or more buttons, a slider bar, a dial, a knob, a mouse, or a joystick. The system 900 also includes a display 912 that is communicably coupled via a wired or wireless connection. The display 912 displays information, such as information related to the operation of system 900. For example, information displayed by the display 912 includes current settings of a cutter implement, such as position information of a swath flap and side shields of the cutting implement. In some instances, the information displayed by the display 912 is displayed via a graphical user interface (GUI) 914. Example displays include cathode ray tubes (CRT), liquid crystal displays (LCDs), or plasma displays. Other types of displays are also within the scope of the present disclosure. In some implementations, the display 912 is a touch screen that is operable to receive input from a user via a user's touch. In some implementations in which the display 912 is a touch screen, the control 910 is omitted. The system also includes actuators 916, 918, and 920. The controller 902 is communicably coupled to the actuators 916, 918, and 920 via a wired or wireless connection. The actuator 916 functions to actuate a swath flap 922 and the actuators 918 and 920 function to actuate side shields 924 and 926, respectively. Example actuators include hydraulic actuators, pneumatic actuators, electrical actuators, or mechanical actuators. Example actuators also include linear actuators or, rotary actuators. For example, in some instances, hydraulic cylinders are used.

In operation, the controller 902 receives a control input, such as from the control 910 or display 912. The control input representing a desired windrow width to be produced by a position sensor 918 and 920. Further, the control input is a single control input that, when received by the controller 902, is used to position both the swath flap 922 and the side shields 924 and 926 to produce a windrow having a width represented by the control input.

The controller 902 receives control input and, using software 908, determines a position of the swath flap 922 and the side shields 924 and 926 to produce a windrow represented by the control input. In some implementations, the software 908 includes a lookup table, which may be similar to the lookup table 800 described earlier, and uses the lookup table to determine positions of the swath flap 922 and the side shields 924 and 926 used to produce a windrow having a width defined by the control input. In other implementations, the software may include a mathematical relationship or algorithm that is used to determine a position of each of the swath flap 922 and the side shields 924 and 926 based on the single control input. Thus, a single control input is used to define positions of both the swath flap 922 and the side shields 924 and 926. A new control input, representing a different windrow width, can be inputted, and new positions of one or both of the swath flap 922 and side shields 924 and 926 are determinable based on the new control input.

The control system 900 also includes position sensors 928, 930, and 932 that detect positions of the swath flap 922 and side shields 924 and 926, respectively. In some implementations, a single position sensor is used to detect the positions of both of the side shields 924 and 926. Example position sensors include rotational sensors, linear sensors, and angular position sensors. Further, example positional sensors include inductive position sensors (e.g., linear variable differential transformer sensors, inductive proximity sensors, rotary encoders, incremental encoders, absolute position encoders, and binary encoders), potentiometric position sensors, eddy current-based position sensors, capacitive position sensors, magnetorestrictive position sensors, Hall Effect-based magnetic position sensors, fiber-optic position sensors, optical positions sensors, and ultrasonic position sensors.

The controller 902 receives the current position information for the side shields 924 and 926 from the position sensors 930 and 932, respectively, and the current position information for the swath flap 922 from the position sensor 928. The controller 902 compares the current position of each of the side shields 924 and 926 and the swath flap 922 with the determined position for each of these components based on the received control input. If the present position of one or more of these components varies from the determined position for the components associated with the control input, the controller determines how much the respective component needs to move from the detected current position to the determined position associated with the control input and generates and sends a control signal representing this amount of movement to one or more of the respective actuators 916, 218, and 920. Consequently, the controller determines, generates, and sends a control signal to move the side shields 924 and 926, the swath flap 922, or both in order to move the side shields 924 and 926, the swath flap 922, or both to the position that is determined from the control input.

Thus, the control system 900 operates to receive a control input that defines a desired width of a windrow to be produced or that is presently being produced, determine a position of each of the side shields 924 and 926 and a position of the swath flap 922 associated with producing a windrow having the desired width, determine a present position of the side shields 924 and 926 and swath flap 922, generate one or more control signals for altering a position of one or both of the side shields 924 and 926 and swath flap 922, and send the one or more control signals to some or all of the actuators 918, 920, and 916 to alter a position of one or both of the side shields 924 and 926 and swath flap 922 to correspond to the positions associated with forming a windrow having the desired width.

Figure 10:
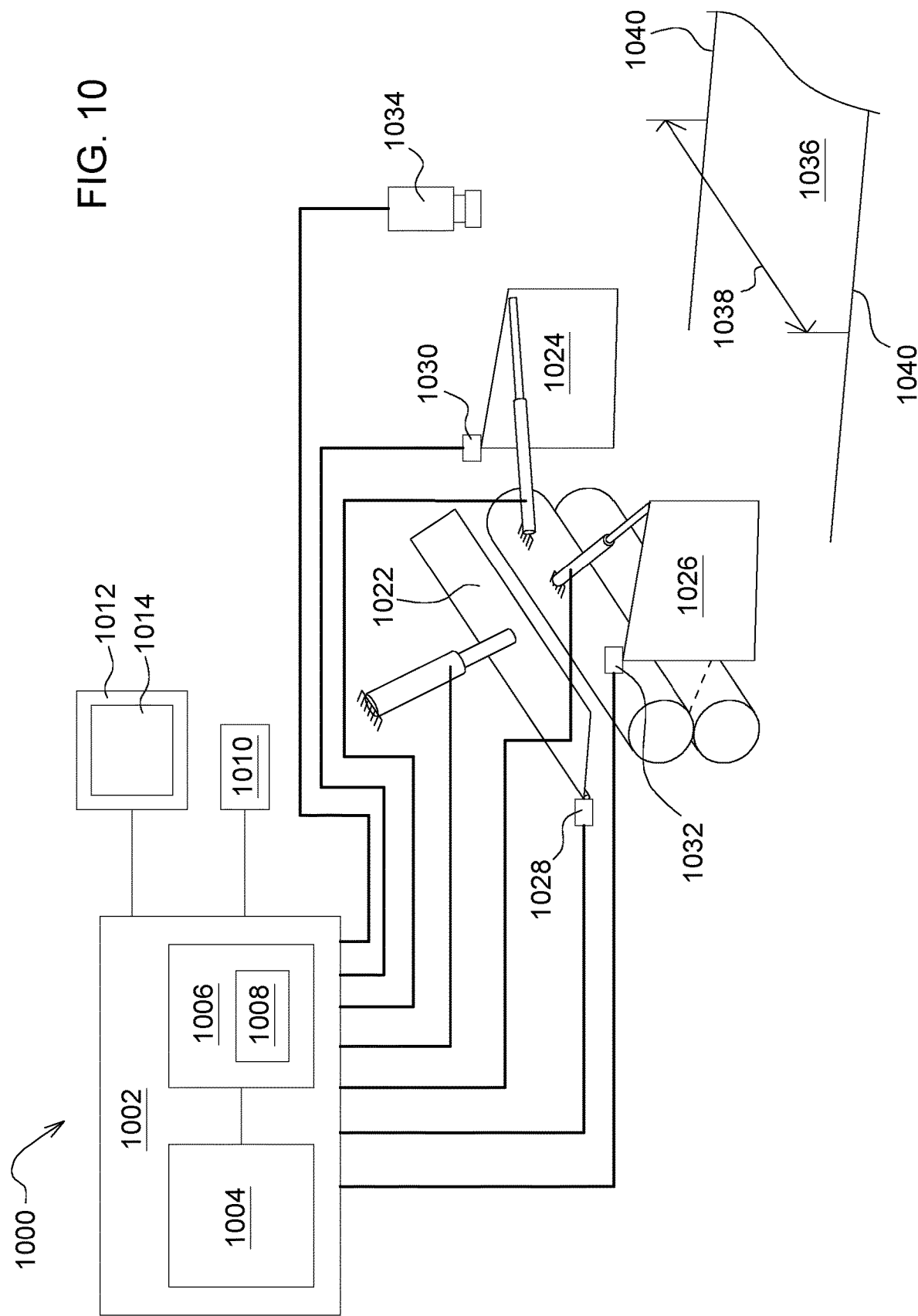
FIG. 10 is a schematic view of another example control system, according to some implementations of the present disclosure.

FIG. 10 is a schematic diagram of another example control system 1000. The control system 1000 is similar to the control system 900, described earlier, but also includes feedback functionality that actively monitors a position of side shields, a swath flap, or both. In some implementations, the feedback functionality includes intermittently or continuously optically monitoring a size of a windrow being produced and altering a position of one or both of the side shields and swath flap to form a windrow having a width associated with the control input.

The control system 1000 includes a controller 1002 having a processor 1004 and a memory 1006 communicably coupled to the processor; software 1008; a control 1010; a display 1012; a GUI 1014; actuators 1016, 1018, and 1020; a swath flap 1022; side shields 1024 and 1026; and position sensors 1028, 1030, and 1032. These features are similar to the counterpart features described in the context of the control system 900, described earlier, and, therefore, a description of these features is not repeated. Differences between the control system 900 and the control system 1000 are described below.

The control system 1000 also includes an optical sensor 1034 that senses the windrow 1036 produced by the side shields 1024 and 1026 and swath flap 1022. The optical sensor 1034 is communicably coupled to the controller via a wired or wireless connection. In some implementations, the control system 1000 includes more than one optical sensor 1034 to sense the windrow 1036. Example optical sensors include a camera, a stereo camera, an infrared sensor, lidar, or radar. Other types of optical sensors are also within the scope of the present disclosure.

The optical sensor 1034 captures one or more images of the windrow 1036, and the one or more images are transmitted to the controller 1002. The controller 1002 processes the images, such as according to computer instructions contained in the software 1008, to detect edges 1040 of the windrow 1036, and determines a distance between the detected edges. In some implementations, the software 1008 includes an image analyzer that uses one or more image analysis techniques to identify features, such as edges 1040, of the windrow 1036. For example, the image analyzer may use one or more of the following image analysis techniques: Canny edge detection, Deriche edge detection, Differential edge detection, Sobel edge detection, Prewitt edge detection, and Robert's Cross edge detection. Other types of edge detection methodologies are also within the scope of the present disclosure. Further, in some implementations, other methodologies are used to detect the windrow 1036 or edges 1040 thereof. For example, in some instances, one or both of the windrow 1036 or edges 1040 of the windrow 1036 are detected using blob detection methods (e.g., Laplacian of Gaussian blog detection, Difference of Gaussian blob detection, Determinant of Hessian blob detection, and Maximally Stable Extreme Regions blob detection); ridge detection methods (e.g., Hough Transform ridge detection); and feature detection methods (e.g., Affine Shape Adaptation, Harris Affine, and Hessian Affine). Moreover, any type of image analysis technique capable of detecting edges 1040 of the windrow 1036 can be used. Red Green Blue (RGB) analysis can also be used to detect windrows, such as windrow 1036.

Still further, in some implementations, machine learning algorithms are also used to identify features within the collected images, such as the edges 1040 of the windrow 1036. Example machine learning algorithms include, but are not limited to, supervised learning algorithms, unsupervised learning algorithms, semi-supervised learning algorithms, and reinforcement learning algorithms.

This distance between the detected edges 1040 corresponds to the width 1038 of the windrow 1036. The controller 1002 compares the determined width 1038 to the width associated with a control input received by the control system 1000. As explained earlier, the control input defines a desired width of a windrow to be produced. In response to the comparison, the controller 1002 determines whether a variance exists between the desired windrow width and the determined windrow width 1038. If a variance exists, the controller alters a position of one or both of the swath flap 1022 and the side shields 1024 and 1026 in order to alter the width of the produced windrow 1036. For example, if the controller 1002 determines that the width 1038 is greater than the desired windrow width associated with the control input, the controller alters one or both of the positions of the swath flap 1022 and the side shields 1024 and 1026 to reduce the width 1038 of the windrow 1036. Alternatively, if the controller 1002 determines that the width 1038 is less than the desired windrow width associated with the control input, the controller alters one or both of the positions of the swath flap 1022 and the side shields 1024 and 1026 to increase the width 1038 of the windrow 1036. In some implementations, the controller 1002 uses a lookup table, which may be similar to the lookup table 800 discussed above, to determine an amount by which to alter a position of the side shields 1024 and 1026, the swath flap 1022, or both. In some implementations, the width 1038 of the windrow 1036 is monitored continuously to continuously adjust, as detected, the width 1038 to correspond to the desired width associated with the control input. In other implementations, the width 1038 is monitored intermittently at regular or irregular time intervals. For example, in some instances, the time interval is based on a selected time interval or based on the occurrence of a defined event, such as a speed of a work vehicle.

Figure 11:
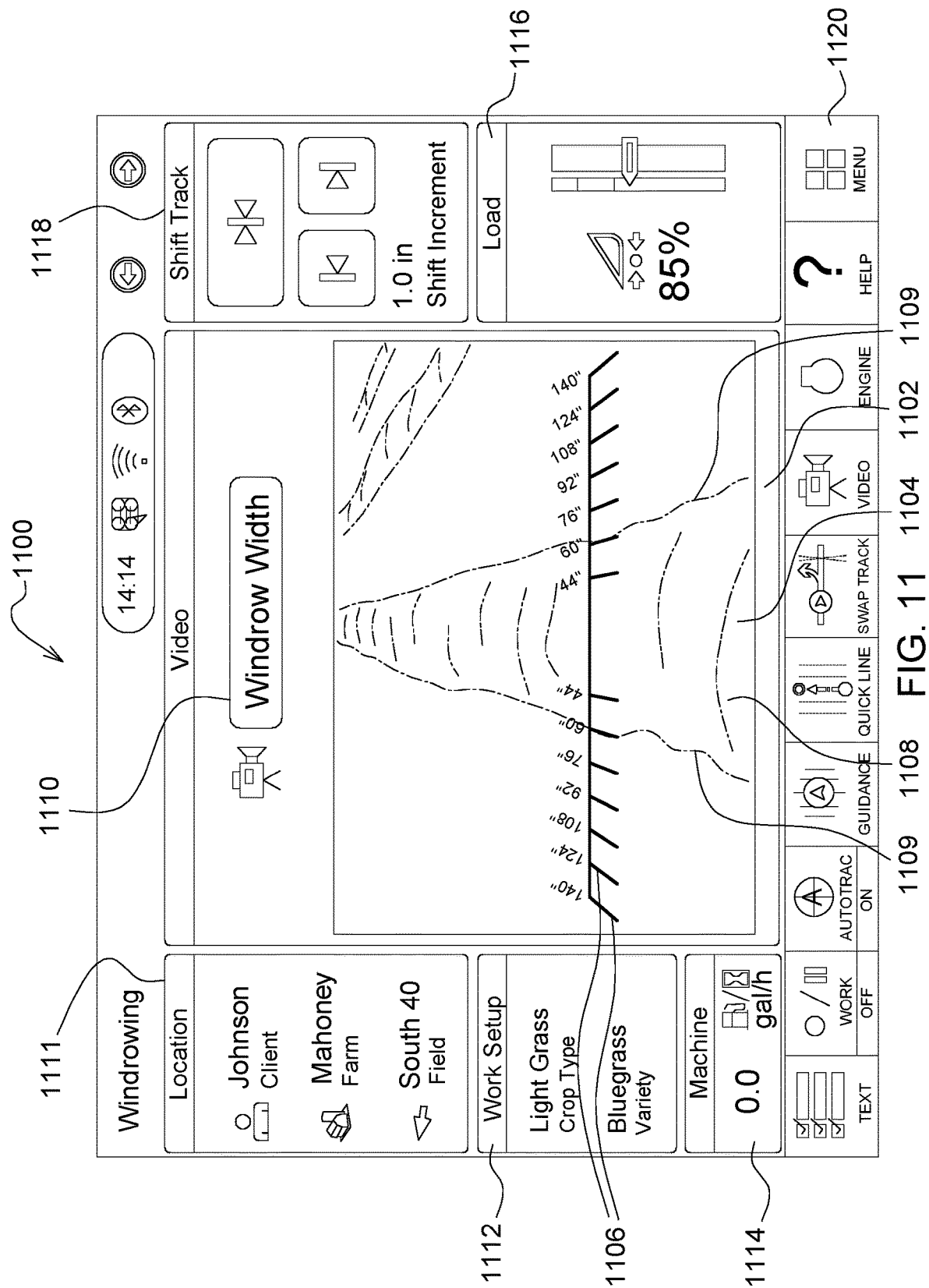
FIG. 11 is a graphical image of an example graphical user interface, according to some implementations of the present disclosure.

In some implementations, the display 1014 displays an image of the windrow 1036. For example, FIG. 11 is a representation of a GUI 1100, which may be similar to GUI 1014. The GUI 1100 includes a window 1102 that shows an image 1104 captured by an image sensor, such as image sensor 1034. In some instances, the image 1104 is a still image. In other implementations, the image 1104 is a video image. The window 1102 includes gauge marks 1106 superimposed over the image 1104. The gauge marks 1106 serve as a visual indicator of a physical size of the illustrated windrow 1108. The gauge marks 1106 that corresponds to edges 1109 of the windrow 1108 provide a visual indication of a width of the windrow 1108. In the illustrated example, the gauge marks 1106 are visual indications of the width of the windrow 1108. As indicated in FIG. 11, the gauge marks 1106 are angled lines, and the angle of the gauge marks 1106 changes across the window 1102 so as to resemble a perspective of the windrow 1102 as would be viewed by an operator. In other implementations, some or all of the gauge marks 1106 are parallel.

In the illustrated example, the GUI 1100 includes an indicator 1110 that identifies a control function presently being performed or displayed. In this instance, the indicator 1110 identifies a windrow width as the presently displayed control function. The GUI 1100 also includes a location field 1111. In some instances, the location field 1111 identifies a location where an operation is occurring. In this example, the location field 1111 identifies a location where the present windrowing operation is being performed. A work setup field 1112 is also provided and identifies a crop type and variety presently being cut and formed into a windrow. A machine field 1114 that identifies a fuel consumption rate is also included. A load field 1116 illustrates a crop material load presently being experienced by a cutter implement being used to cut and windrow the crop material. A shift track field 1118 is also present and is used by an operator to shift a location of the windrow being formed relative to a vehicle being used to form the windrow, e.g., a tractor or other vehicle carrying the cutter implement. A row of soft keys 1120 is also present. The soft keys allow an operator to display other information or make changes to other settings of the computer application being presented in the GUI 1100, cutter implement, or the vehicle carrying the cutter implement. The row of soft keys 1120 may also include buttons to perform other functions. In other configurations, a layout of the GUI 1100 may vary from the illustrated example.

The GUI 1100 and particularly the window 1102 that contains the image 1104 and overlaid gauge marks 1106 provide a visual representation to an operator to allow the operator to judge a size and condition of the windrow being produced. In some implementations, the operator is also able to adjust a size of the windrow manually, such as by using a slider or other control provided on the GUI or elsewhere, to manually adjust a position of the side shields and swath flap using a single control input to the control. For example, the control to manually alter the windrow may represent a percentage of maximum width capable of being created by the cutter implement, and a user is able to adjust that percentage, such as by sliding a slider bar or rotating a knob (whether virtually presented on the GUI 100 or a physical control separate from the GUI 1100), to alter positions of one or both of the side shields and swath flap to produce a windrow having a width corresponding to the user input.

Figure 12:
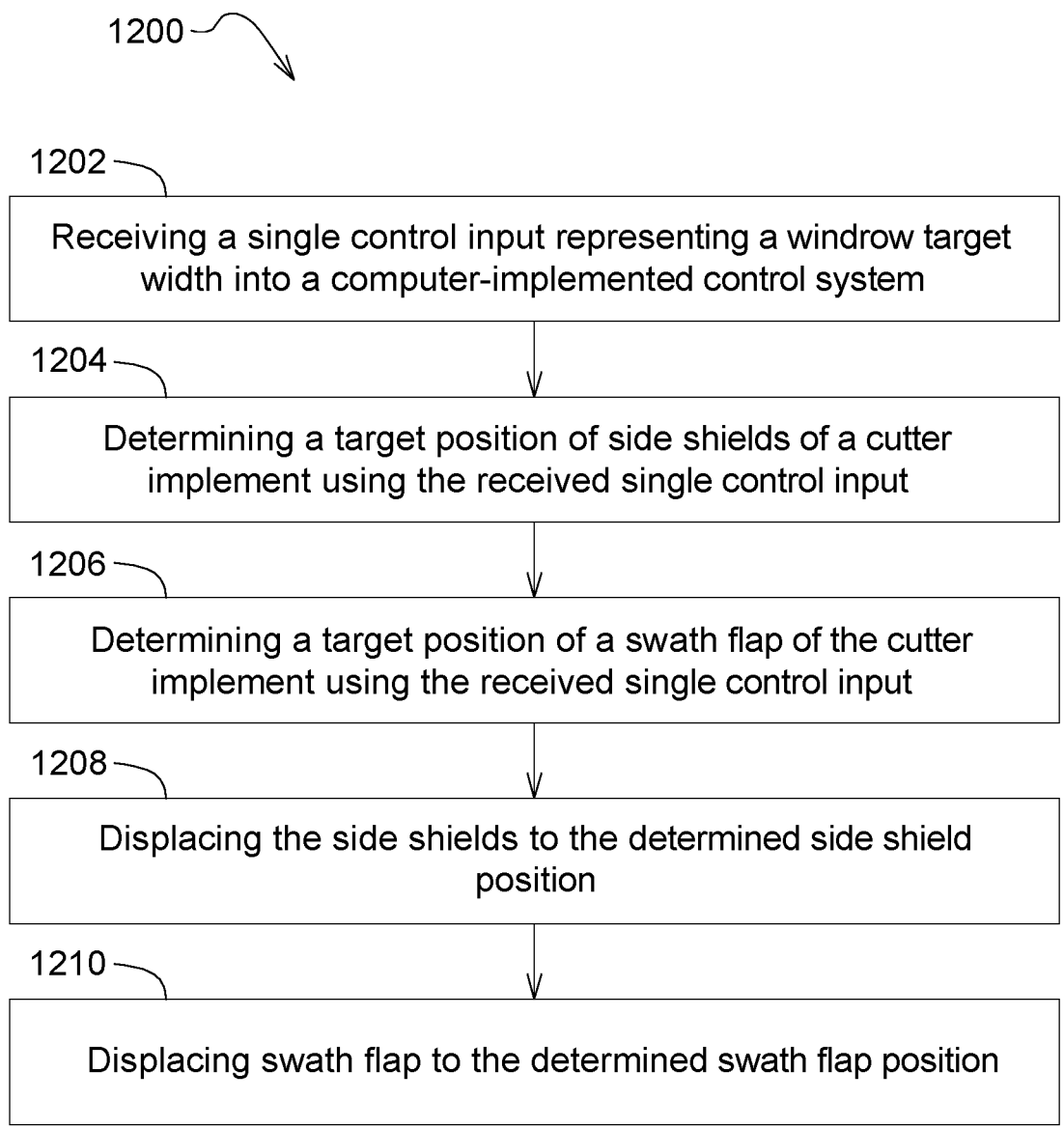
FIG. 12 is a flowchart of an example computer-implemented method for controlling a width of a windrow using a single control input, according to some implementations of the present disclosure.

FIG. 12 is a flowchart for an example method 1200 of forming a windrow with a cutter implement using a single control input. At 1202, a single control input representing a desired width of a windrow is received into a computer-implemented control system, which may be similar to the control system 900 or 1000. At 1204, a processor of the control system determines a target position of side shields of the cutter implement to form a windrow having the desired width using the single control input. At 1206, the processor of the control system determines a target position of a swath flap of the cutter implement to form the windrow having the desire width using the single control input. In some implementations, the target positions for the swath flap and the side shields are determined using a lookup table as described earlier or a numerical relationship, such as a system of equations or other algorithm. At 1208, the side shields are displaced to the target position for the side shields in response to a control signal from the control system, and, at 1210, the swath flap is displaced to the target position for the swath flap in response to a control signal from the control system. In some implementations, the side shields and the swath flap are displaced at the same time. In other implementations, the side shields and the swath flap are displaced at different times. The control signals are transmitted to respective actuators used to displace the side shields and the swath flap. The actuators can be of a type described earlier or any other type of actuator operable to move the side shields or swath flap. In some implementations, a present position of the side shields and swath flap are sensed and those sensed positions are used to determine an amount by which the side shields and swath flap are to be moved in order to locate the side shields and swath flap at the respective target positions.

Figure 13:
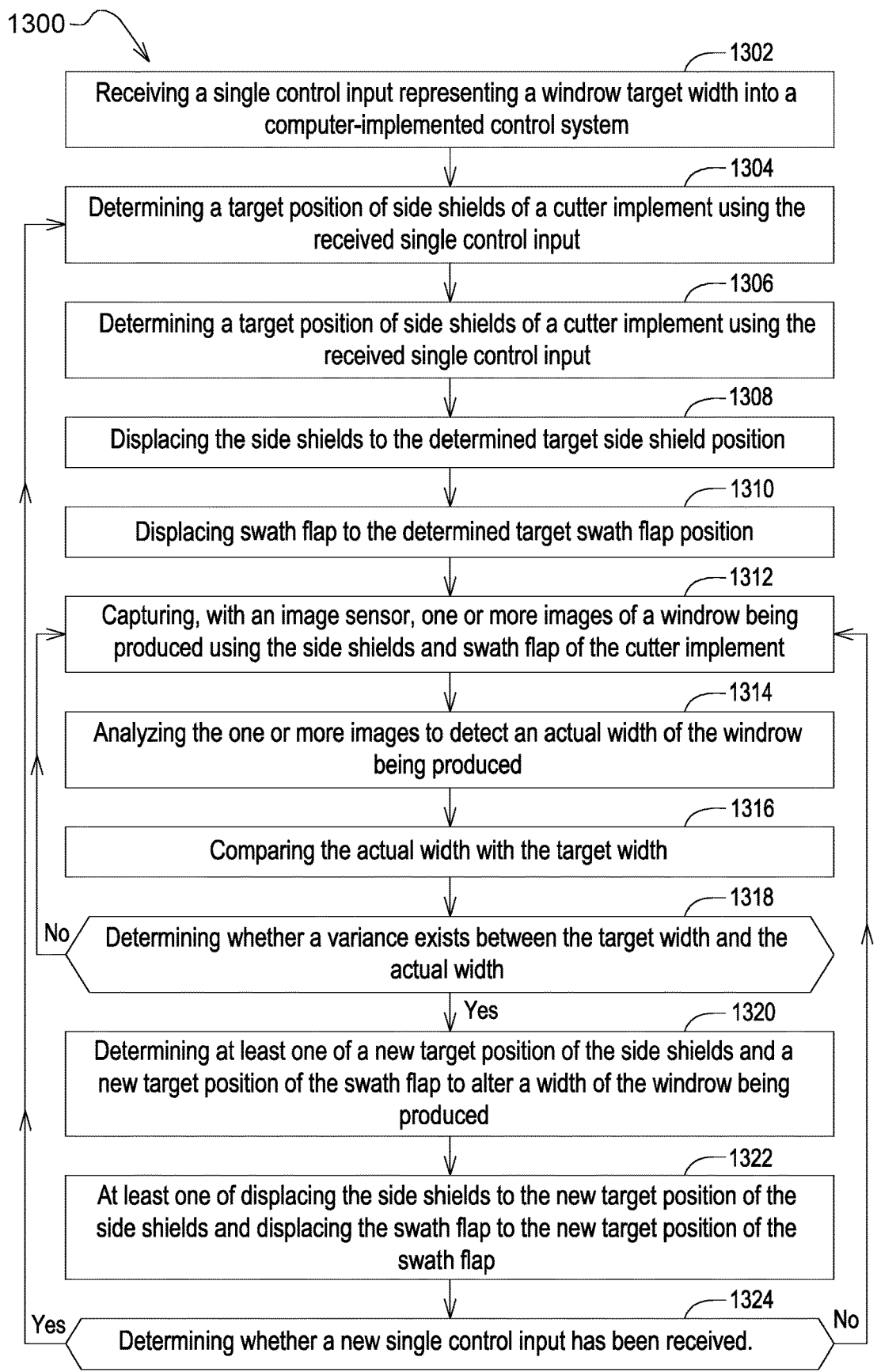
FIG. 13 is a flowchart of another example computer-implemented method for controlling a width of a windrow using a single control input, according to some implementations of the present disclosure.

FIG. 13 is a flowchart of another example method 1300 of forming a windrow with a cutter implement using a single control input and using feedback to maintain a windrow at a desired width. The aspects of the method 1300 identified with reference numbers 1302 through 1310 are identical to those identified with reference number 1202 through 1210, described above, with respect the method 1200 and, as such, are not repeated. At 1312, one or more images of a windrow being produced by the cutter implement is captured using an optical sensor. The optical sensor may be one or more of the types of optical sensors described earlier. At 1314, the one or more images are analyzed by computer-implemented control system, such as an image analyzer being executed on a processor of the computer-implemented control system, to detect an actual width of the windrow being produced. For example, the actual width may be determined by detecting edges of the windrow being produced, such as using edge detection or another type of feature detection method described above. The actual width of the windrow is determinable by measuring a distance between the detected edges. At 1316, the actual width of the produced windrow is compared to the desired width. In some implementations, an operator performs the comparison. In other implementations, a computer system, such as controller 902 or controller 1004, performs the comparison electronically. At 1318, a determination is made as to whether a variance exists between the target width and the desired width. The variance can represent that the actual width is greater or less than the desired width. In some implementations, an operator determines whether a variance exists. In other implementations, a computer system, such as the control 902 or controller 1004, determines whether a variance exists electronically. If a variance exists, at 1320, at least one of a new target position of the side shields and a new target position of the swath flap is determined. In some implementations, an operator determines the new target position electronically. In other implementations, a computer system, such as the control 902 or controller 1004, determines the new target position electronically. At 1322, the side shields are displaced to the new target position for the side shields, the swath flap is displaced to the new target position for the swath flap, or both are repositioned to the respective new target positions to alter the actual width of the windrow being produced, and the method 1300 move to 1324 where a determination is made as to whether a new single control input has been received. If a new single control input has been received, the method 1300 returns to 1304. If a new single control input has not been received, the method 1300 returns to 1312. If a variance does not exist, the method 1300 moves to 1312, where additional images of the produced windrow are captured.

Without in any way limiting the scope, interpretation, or application of the claims appearing below, a technical effect of one or more of the example implementations disclosed herein is to provide control of a size of a windrow, e.g., a width of a windrow being produced by a cutter implement, with a single control input. Another technical effect of one or more of the example implementations disclosed herein is reduction of trial and error conventionally needed in order to establish a desired windrow size, thereby creating a desired windrow more efficiently. Another technical effect of one or more of the example implementations disclosed herein is providing for improved control of windrow size selection during the course of a windrow operation, thereby reducing operator fatigue.

Figure 14:
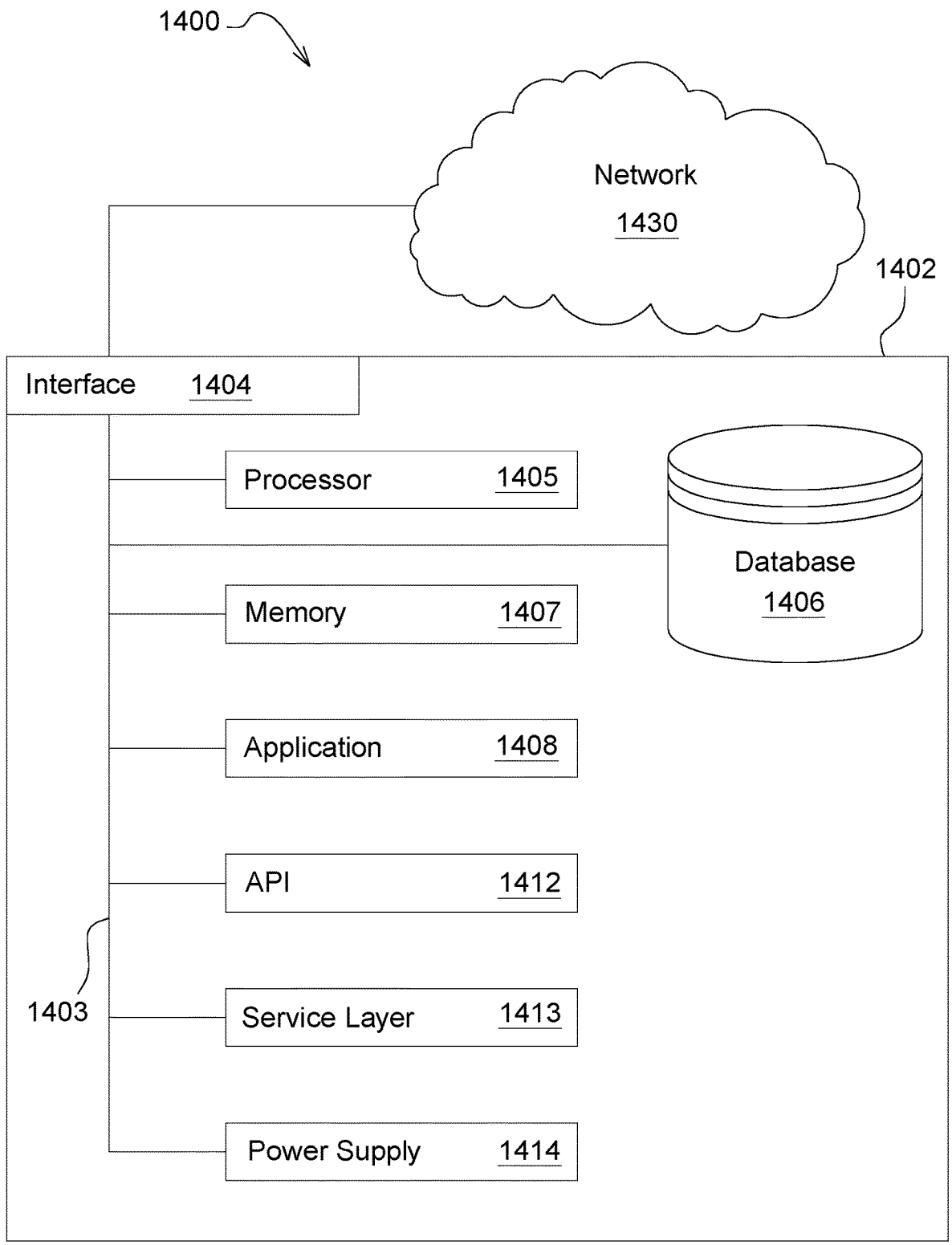
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a high level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both), over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the interface's hardware can be operable to communicate physical signals within and outside of the illustrated computer 1402.

The computer 1402 includes a processor 1405. Although illustrated as a single processor 1405 in FIG. 14, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Described implementations of the subject matter can include one or more features, alone or in combination.

For example, in a first implementation, a computer-implemented method, including: receiving a single control input by an input device, the single control input representing a desired width of a windrow produced by a cutter implement; determining, with an electronic processor, a first target position of side shields of the cutter implement in response to the received single control input; determining, with the electronic processor, a second target position of a swath flap of the cutter implement in response to the received single input; displacing the side shields to the first target position; and displacing the swath flap to the second target position.

The foregoing and other described implementations can each, optionally, include one or more of the following features:

A first feature, combinable with any of the following features, the method further including: detecting, with first position sensors, a first position of the side shields and detecting, with a second position sensor, a second position of the swath flat, wherein displacing the side shields to the first target position includes displacing the side shields from the first position to the first target position and wherein displacing the swath flap to the second target position includes displacing the swath flap from the second position to the second target position.

A second feature, combinable with any of the previous or following features, the method further including: detecting a width of a windrow produced by the cutter implement; comparing the detected width to the desired width; determining a variance based on the comparison of the detected with and the selected width; and moving at least one of the side shields and the swath flap to reduce or eliminate the variance.

A third feature, combinable with any of the previous or following features, wherein detecting a width of the windrow produced by the cutter implement includes sensing the windrow with an optical sensor.

A fourth feature, combinable with any of the previous or following features, wherein the optical sensor includes a camera.

A fifth feature, combinable with any of the previous or following features, wherein the camera includes a stereo camera.

A sixth feature, combinable with any of the previous or following features, wherein determining a first target position of side shields of the cutter implement in response to the received single control input includes using a reference table to identify the first target position and wherein determining the second target position of the swath flap of the cutter implement in response to the received single input includes using the lookup table to identify the second target position.

A seventh feature, combinable with any of the previous or following features, wherein receiving the single control input that represents the desired width of the windrow produced by the cutter implement includes receiving the single control input via a user interface.

An eighth feature, combinable with any of the previous or following features, wherein displacing the side shields to the first target position includes actuating first actuators in response to a received first control signal and wherein displacing the swath flap to the second target position includes actuating a second actuator in response to a received second control signal.

A ninth feature, combinable with any of the previous features, wherein the first target position of the side shields and the second target position of the swath flap are correlated to produce a windrow having the desired width during an agricultural operation.

In a second implementation, a non-transitory, computer-readable medium storing one or more instructions executable by a computer system to perform operations including: receiving a single control input by an input device, the single control input representing a desired width of a windrow produced by a cutter implement; determining, with an electronic processor, a first target position of side shields of the cutter implement in response to the received single control input; determining, with the electronic processor, a second target position of a swath flap of the cutter implement in response to the received single input; displacing the side shields to the first target position; and displacing the swath flap to the second target position.

The foregoing and other described implementations can each, optionally, include one or more of the following features:

A first feature, combinable with any of the following features, the non-transitory, computer-readable medium storing one or more instructions executable by a computer system to perform operations including: detecting a first position of the side shields and detecting a second position of the swath flat, wherein displacing the side shields to the first target position includes displacing the side shields from the first position to the first target position and wherein displacing the swath flap to the second target position includes displacing the swath flap from the second position to the second target position.

A second feature, combinable with any of the previous or following features, the non-transitory, computer-readable medium storing one or more instructions executable by a computer system to perform operations including: detecting a width of a windrow produced by the cutter implement; comparing the detected width to the desired width; determining a variance based on the comparison of the detected with and the selected width; and moving at least one of the side shields and the swath flap to reduce or eliminate the variance.

A third feature, combinable with any of the previous or following features, wherein detecting a width of the windrow produced by the cutter implement includes sensing the windrow with an optical sensor.

A fourth feature, combinable with any of the previous or following features, wherein the optical sensor includes a camera.

A fifth feature, combinable with any of the previous or following features, wherein the camera includes a stereo camera.

A sixth feature, combinable with any of the previous or following features, wherein determining a first target position of side shields of the cutter implement in response to the received single control input includes using a reference table to identify the first target position and wherein determining the second target position of the swath flap of the cutter implement in response to the received single input includes using the lookup table to identify the second target position.

A seventh feature, combinable with any of the previous or following features, wherein receiving the single control input that represents the desired width of the windrow produced by the cutter implement includes receiving the single control input via a user interface.

An eighth feature, combinable with any of the previous or following features, wherein displacing the side shields to the first target position includes actuating first actuators in response to a received first control signal and wherein displacing the swath flap to the second target position includes actuating a second actuator in response to a received second control signal.

A ninth feature, combinable with any of the previous features, wherein the first target position of the side shields and the second target position of the swath flap are correlated to produce a windrow having the desired width during an agricultural operation.

In a third implementation, a computer-implemented system, comprising one or more processors and a non-transitory computer-readable storage medium coupled to the one or more processors and storing programming instructions for execution by the one or more processors, the programming instructions instructing the one or more processors to: receive a single control input by an input device, the single control input representing a desired width of a windrow produced by a cutter implement; determine a first target position of side shields of the cutter implement in response to the received single control input; determine a second target position of a swath flap of the cutter implement in response to the received single input; displacing the side shields to the first target position; and displace the swath flap to the second target position The foregoing and other described implementations can each, optionally, include one or more of the following features:

A first feature, combinable with any of the following features, wherein the programming instructions for execution by the one or more processors further include programming instructions instructing the one or more processors to: detect, with first position sensors, a first position of the side shields and detecting, with a second position sensor, a second position of the swath flat, wherein the programming instructions that instruct the one or more processors to displace the side shields to the first target position include programming instructions that instruct the one or more processors to displace the side shields from the first position to the first target position and wherein the programming instructions that instruct the one or more processors to displacing the swath flap to the second target position includes programming instructions that instruct the one or more processors to displacing the swath flap from the second position to the second target position.

A second feature, combinable with any of the previous or following features, wherein the programming instructions for execution by the one or more processors further include programming instructions instructing the one or more processors to: detect a width of a windrow produced by the cutter implement; compare the detected width to the desired width; determine a variance based on the comparison of the detected with and the selected width; and move at least one of the side shields and the swath flap to reduce or eliminate the variance.

A third feature, combinable with any of the previous or following features, wherein the programming instructions that instruct the one or more processors to detect a width of the windrow produced by the cutter implement include programming instructions that instruct the one or more processors to sense the windrow with an optical sensor.

A fourth feature, combinable with any of the previous or following features, wherein the optical sensor includes a camera.

A fifth feature, combinable with any of the previous or following features, wherein the camera includes a stereo camera.

A sixth feature, combinable with any of the previous or following features, wherein the programming instructions that instruct the one or more processors to determine a first target position of side shields of the cutter implement in response to the received single control input includes the programming instructions that instruct the one or more processors to use a reference table to identify the first target position and wherein the programming instructions that instruct the one or more processors to determine the second target position of the swath flap of the cutter implement in response to the received single input includes the programming instructions that instruct the one or more processors to use the lookup table to identify the second target position.

A seventh feature, combinable with any of the previous or following features, wherein the programming instructions that instruct the one or more processors to receive the single control input that represents the desired width of the windrow produced by the cutter implement includes programming instructions that instruct the one or more processors to receive the single control input via a user interface.

An eighth feature, combinable with any of the previous or following features, wherein the programming instructions that instruct the one or more processors to displace the side shields to the first target position includes programming instructions that instruct the one or more processors to actuate first actuators in response to a received first control signal and wherein displacing the swath flap to the second target position includes actuating a second actuator in response to a received second control signal.

A ninth feature, combinable with any of the previous features, wherein the first target position of the side shields and the second target position of the swath flap are correlated to produce a windrow having the desired width during an agricultural operation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A system for controlling a width of a windrow using a single user input, the system comprising:
   a cutter implement comprising:
      side shields lateral offset from each other, the side shields moveable within a first range;
      a swath flap extending laterally between the side shields, the swath flap movable within a second range, the side shields movable to a first position within the first range and the swath flap movable to a second position within the second range in response to a single control input;
      wherein the single control input defines a selected windrow width, wherein a plurality of position combinations of the swath flap and the side shield along the first range and the second range, respectively, define the selected windrow width, and wherein the plurality of position combinations are selectable in a pre-determined sequence that is based on a grid location of the plurality of position combinations in a lookup table.

2. The system of claim 1, wherein the single control input defines a desired width of a windrow to be produced by the cutter implement, and wherein movement of the side shields to the first position within first range and movement of the swath flap to the second position within the second range in response to the single control input produces a windrow having the desired width during an agricultural operation.

3. The system of claim 2, further comprising a feedback system comprising:

an optical sensor that detects a width of the produced windrow; and a computer-implemented controller that compares the detected width of the produced windrow with the desired width, detects a variance between the detected width and the desired width; and alters a position of one of the side shields and the swath flap to reduce or eliminate the variance.

4. The system of claim 3, wherein the optical sensor comprises a camera.

5. The system of claim 4, wherein the camera comprises a stereo camera.

6. The system of claim 1, further comprising an input device that receives the single control input.

7. The system of claim 6, further comprising a computer-implemented controller coupled to the input device, wherein the computer-implemented controller determines the first position of the side shields in response to receipt of the single control input and determine the second position of the swath flap in response to receipt of the single control input, generates a first control signal that defines a movement of the side shields to the first position, and generates a second control signal that defines a movement of the swath flap to the second position.

8. The system of claim 7, further comprising at least one first actuator coupled to the side shields and a second actuator coupled to the swath flap, wherein the at least one first actuator receives the first control signal and displace the side shields to the first position in response to the first control signal, and wherein the second actuator receives the second control signal and displaces the swath flap to the second position in response to the second control signal.

9. The system of claim 1, wherein the first position of the side shields and the second position of the swath flap are correlated to produce a windrow having a desired width during an agricultural operation.

10. The system of claim 9, wherein the correlation comprises one of a lookup table or a mathematical relationship.

11. A computer-implemented method for controlling a width of a windrow using a single user input, the method comprising:

receiving a single control input by an input device, the single control input representing a desired width of a windrow produced by a cutter implement;

determining, with an electronic processor, a first target position of side shields of the cutter implement in response to the received single control input;

determining, with the electronic processor, a second target position of a swath flap of the cutter implement in response to the received single input;

displacing the side shields to the first target position; and displacing the swath flap to the second target position;

wherein a plurality of combinations of positions of the swath flap and the side shields define the desired width of the windrow, and wherein the plurality of position combinations are selectable in a pre-determined sequence that is based on a grid location of the plurality of position combinations in a lookup table.

12. The computer-implemented method of claim 11, further comprising:

detecting, with at least one first position sensor, a first position of the side shields; and detecting, with a second position sensor, a second position of the swath flat, wherein displacing the side shields to the first target position comprises displacing the side shields from the first position to the first target position, and wherein displacing the swath flap to the second target position comprises displacing the swath flap from the second position to the second target position.

13. The computer-implemented method of claim 11, further comprising:

detecting a width of a windrow produced by the cutter implement;

comparing the detected width to the desired width;

determining a variance based on the comparison of the detected with and the selected width; and moving at least one of the side shields and the swath flap to reduce or eliminate the variance.

14. The computer-implemented method of claim 13, wherein detecting a width of the windrow produced by the cutter implement comprises sensing the windrow with an optical sensor.

15. The computer-implemented method of claim 13, wherein the optical sensor comprises a camera.

16. The computer-implemented method of claim 15, wherein the camera comprises a stereo camera.

17. The computer-implemented method of claim 11, wherein determining the first target position of side shields of the cutter implement in response to the received single control input comprises using the lookup table to identify the first target position and wherein determining the second target position of the swath flap of the cutter implement in response to the received single input comprises using the lookup table to identify the second target position.

18. The computer-implemented method of claim 11, wherein receiving the single control input that represents the desired width of the windrow produced by the cutter implement comprises receiving the single control input via a user interface.

19. The computer-implemented method of claim 11, wherein displacing the side shields to the first target position comprises actuating at least one first actuator in response to a received first control signal and wherein displacing the swath flap to the second target position comprises actuating a second actuator in response to a received second control signal.

20. The computer-implemented method of claim 11, wherein the first target position of the side shields and the second target position of the swath flap are correlated to produce a windrow having the desired width during an agricultural operation.

21. The computer-implemented method of claim 11, wherein as an operator cycles through the plurality of position combinations, the electronic processor moves to the next grid location in the pre-programmed sequence.

22. The computer-implemented method of claim 11, wherein the pre-determined sequence that is based on grid location of the plurality of position combinations in the lookup table moves from one corner of the lookup table to an opposite corner of the lookup table.

23. The computer-implemented method of claim 11, further comprising displaying, via a display, an image of the windrow having gauge marks superimposed over the image, the gauge marks providing a visual indicator of a physical size of the windrow.

\* \* \* \* \*